US009821865B2

(12) United States Patent
Martel

(10) Patent No.: US 9,821,865 B2
(45) Date of Patent: Nov. 21, 2017

(54) COMPACT PULLING APPARATUS

(71) Applicant: Yvon Martel, Chicoutimi (CA)

(72) Inventor: Yvon Martel, Chicoutimi (CA)

( * ) Notice: Subject to any disclaimer, the term of this patent is extended or adjusted under 35 U.S.C. 154(b) by 36 days.

(21) Appl. No.: 14/991,586

(22) Filed: Jan. 8, 2016

(65) Prior Publication Data

US 2016/0121944 A1    May 5, 2016

Related U.S. Application Data

(63) Continuation of application No. PCT/CA2014/050626, filed on Jun. 30, 2014.

(60) Provisional application No. 61/844,893, filed on Jul. 11, 2013.

(51) Int. Cl.
| | | |
|---|---|---|
| *B62D 55/07* | (2006.01) | |
| *E01H 5/06* | (2006.01) | |
| *B62D 51/04* | (2006.01) | |
| B62D 53/00 | (2006.01) | |
| B60K 1/00 | (2006.01) | |
| B60K 1/04 | (2006.01) | |

(52) U.S. Cl.
CPC ............ *B62D 55/07* (2013.01); *B62D 51/04* (2013.01); *E01H 5/061* (2013.01); B60K 1/00 (2013.01); B60K 1/04 (2013.01); B60K 2001/005 (2013.01); B60K 2001/006 (2013.01); B60Y 2200/25 (2013.01); B60Y 2200/46 (2013.01); B62D 53/00 (2013.01)

(58) Field of Classification Search
CPC ................................ B62D 55/07; B62D 51/04
See application file for complete search history.

(56) References Cited

U.S. PATENT DOCUMENTS

| 758,757 A | 5/1904 | Jones |
|---|---|---|
| 1,287,261 A | 12/1918 | Domer |
| 1,317,103 A | 9/1919 | Rimailho |
| 1,694,790 A | 12/1928 | Nelson |
| 2,046,560 A | 7/1936 | Johnson et al. |

(Continued)

FOREIGN PATENT DOCUMENTS

| CA | 2135653 A1 | 9/1996 |
|---|---|---|
| CA | 2294527 A1 | 12/1998 |

(Continued)

OTHER PUBLICATIONS

Machine translation in English of RU-119318.

(Continued)

*Primary Examiner* — Kevin Hurley
(74) *Attorney, Agent, or Firm* — IPAXIO S.E.N.C.

(57) ABSTRACT

The compact pulling apparatus includes a watertight elongated housing extending along a longitudinal axis and a track disposed around the housing along its longitudinal axis. The track enables the apparatus to move when rotatably driven around the housing. Depending on the implementation, the apparatus can include a generator/motor to selectively produce electricity which can power external equipment and rotatably drive the track, and/or a fuel-power engine. The apparatus further includes a power train assembly by which the rotating output power is transmitted from inside to outside the housing by the power train assembly using at least one rotatable shaft section sealingly extending across a corresponding one of the walls of the housing.

20 Claims, 12 Drawing Sheets

(56) References Cited

U.S. PATENT DOCUMENTS

| | | | |
|---|---|---|---|
| 2,171,846 A | 9/1939 | Davidson | |
| 2,196,458 A | 4/1940 | Flynn et al. | |
| 2,289,768 A | 7/1942 | Fehrenbacher | |
| 2,345,496 A | 3/1944 | Opheim | |
| 2,393,309 A | 1/1946 | Cochran | |
| 2,519,745 A | 8/1950 | Danielson et al. | |
| 2,702,088 A | 2/1955 | Klimek | |
| 2,855,059 A | 10/1958 | Sutherland | |
| 2,887,343 A | 5/1959 | West | |
| 3,068,950 A | 12/1962 | Davidson | |
| 3,146,840 A | 9/1964 | Walsh | |
| 3,158,882 A | 12/1964 | Kibby | |
| 3,198,273 A | 8/1965 | Turpen, Jr. | |
| 3,221,830 A | 12/1965 | Walsh | |
| 3,231,036 A | 1/1966 | Appenrodt | |
| 3,259,200 A | 7/1966 | Maijala | |
| 3,269,475 A | 8/1966 | Voelker | |
| 3,311,424 A | 3/1967 | Taylor | |
| 3,382,943 A | 5/1968 | Anderson | |
| 3,398,806 A | 8/1968 | Hendricks | |
| 3,405,777 A | 10/1968 | Von Kemenczky | |
| 3,418,961 A | 12/1968 | Gregg | |
| 3,427,078 A | 2/1969 | Parsons | |
| 3,446,304 A | 5/1969 | Alimanestiano | |
| 3,509,955 A | 5/1970 | Lichfield | |
| 3,512,658 A | 5/1970 | Harlan | |
| 3,540,152 A | 11/1970 | Beny et al. | |
| 3,554,300 A | 1/1971 | Rosenberg | |
| 3,568,787 A | 3/1971 | Gremeret | |
| 3,590,523 A | 7/1971 | Riesgraf | |
| 3,610,355 A | 10/1971 | Buck | |
| 3,645,348 A | 2/1972 | Thompson | |
| 3,734,221 A | 5/1973 | Labelle | |
| 3,750,777 A | 8/1973 | Thompson | |
| 3,773,127 A | 11/1973 | Aaen et al. | |
| 3,789,941 A | 2/1974 | Robertson | |
| 3,809,173 A | 5/1974 | McLeod | |
| 3,826,323 A | 7/1974 | Mehne | |
| 3,850,130 A | 11/1974 | Heuschober | |
| 3,853,192 A | 12/1974 | Husted | |
| 3,964,560 A | 6/1976 | Husted | |
| 4,096,919 A | 6/1978 | Thompson | |
| 4,102,292 A | 7/1978 | Hunter et al. | |
| 4,146,101 A | 3/1979 | Plourde | |
| 4,175,627 A | 11/1979 | Husted | |
| 4,257,652 A | 3/1981 | Edwards | |
| 4,421,193 A | 12/1983 | Bissett | |
| 4,433,634 A | 2/1984 | Coast | |
| 4,519,470 A * | 5/1985 | Allisio | A63C 5/08 180/180 |
| 4,548,315 A | 10/1985 | Briggs | |
| 4,645,022 A | 2/1987 | Bergquist | |
| 4,747,457 A | 5/1988 | Buscaiolo et al. | |
| 4,789,037 A | 12/1988 | Kneebone | |
| 4,958,584 A * | 9/1990 | Williamson | B60F 3/00 280/6.157 |
| 4,981,188 A * | 1/1991 | Kadela | B60F 3/0015 180/9.25 |
| 4,984,648 A | 1/1991 | Strzok | |
| 5,064,011 A | 11/1991 | Ogano et al. | |
| 5,174,405 A | 12/1992 | Carra et al. | |
| 5,181,478 A | 1/1993 | Berardi | |
| 5,193,632 A | 3/1993 | Clar et al. | |
| 5,332,058 A | 7/1994 | Bianco | |
| 5,363,937 A | 11/1994 | James | |
| 5,499,734 A | 3/1996 | Tessmer | |
| 5,662,186 A | 9/1997 | Welch | |
| 5,799,743 A | 9/1998 | Robinson | |
| 5,828,967 A | 10/1998 | Ueda | |
| 6,193,003 B1 | 2/2001 | Dempster | |
| 6,408,962 B1 | 6/2002 | Ryckman | |
| 6,571,893 B2 | 6/2003 | De-Noor et al. | |
| 6,691,806 B2 | 2/2004 | Wolfgang et al. | |
| 6,725,959 B1 | 4/2004 | Shea et al. | |
| 6,880,651 B2 | 4/2005 | Loh et al. | |
| 7,017,998 B2 | 3/2006 | Ducharme | |
| 7,131,507 B2 | 11/2006 | Wenger et al. | |
| 7,337,760 B2 | 3/2008 | Digregorio | |
| 7,343,644 B2 | 3/2008 | Elmer | |
| 7,389,842 B2 | 6/2008 | Inoguchi et al. | |
| 7,434,644 B2 | 10/2008 | Wier | |
| 7,543,664 B2 | 6/2009 | Nelson | |
| 7,575,075 B2 | 8/2009 | Fairhead | |
| 7,757,797 B2 | 7/2010 | Dobereiner | |
| 7,758,467 B2 | 7/2010 | Ashizawa et al. | |
| 7,798,886 B1 | 9/2010 | Williamson | |
| 7,826,941 B2 | 11/2010 | Hayashi et al. | |
| 7,886,399 B2 * | 2/2011 | Dayton | B08B 9/00 15/104.05 |
| 7,905,310 B2 | 3/2011 | Hues | |
| 7,980,569 B2 | 7/2011 | Azure et al. | |
| 8,002,059 B2 | 8/2011 | Tanishima | |
| 8,030,860 B2 | 10/2011 | Yoshioka | |
| 8,453,769 B2 * | 6/2013 | Martel | B62D 51/04 180/9.22 |
| 8,465,103 B2 | 6/2013 | Burt et al. | |
| 8,528,672 B2 * | 9/2013 | Martel | B62D 51/04 180/9.22 |
| 8,827,014 B2 * | 9/2014 | Martel | B62D 55/07 180/9.22 |
| 2004/0004395 A1 | 1/2004 | Soucy et al. | |
| 2007/0209847 A1 | 9/2007 | Schultz et al. | |
| 2007/0227791 A1 | 10/2007 | Ueno | |
| 2008/0023233 A1 | 1/2008 | Westergaard | |
| 2009/0308667 A1 | 12/2009 | Westerdaard | |
| 2011/0011652 A1 | 1/2011 | Swenson | |
| 2012/0110878 A1 | 5/2012 | Mayer et al. | |
| 2012/0225596 A1 | 9/2012 | Schmidt et al. | |
| 2014/0288763 A1 | 9/2014 | Bennett et al. | |
| 2015/0217815 A1 | 8/2015 | Martel | |

FOREIGN PATENT DOCUMENTS

| | | |
|---|---|---|
| CA | 2762353 A1 | 10/2011 |
| CA | 2772513 A1 | 10/2011 |
| CA | 2776417 A1 | 10/2011 |
| CN | 102009588 A | 4/2011 |
| CN | 102490718 A | 6/2012 |
| CN | 102632782 A | 8/2012 |
| CN | 202728389 U | 2/2013 |
| DE | 4409677 A1 | 8/1994 |
| EP | 0091707 A1 | 10/1983 |
| EP | 0485630 A1 | 5/1992 |
| EP | 0572880 A1 | 12/1993 |
| EP | 1924487 B1 | 7/2009 |
| EP | 2239182 A1 | 10/2010 |
| FR | 1169880 A | 1/1959 |
| FR | 2431304 A1 | 2/1980 |
| FR | 2450191 A1 | 9/1980 |
| FR | 2604367 A1 | 4/1988 |
| FR | 2673545 A1 | 9/1992 |
| FR | 2688701 A1 | 9/1993 |
| FR | 2893585 A1 | 5/2007 |
| GB | 140121 | 3/1920 |
| GB | 1042943 A | 9/1966 |
| GB | 2144689 A | 3/1985 |
| GB | 2390837 A | 1/2004 |
| JP | 4843545 Y1 | 12/1973 |
| JP | 62194187 U | 12/1987 |
| JP | 04228325 A | 8/1992 |
| JP | 2007182137 A | 7/2007 |
| JP | 2004089118 A | 3/2015 |
| RU | 119318 U1 | 8/2012 |
| WO | 9415683 A1 | 7/1994 |
| WO | 2012140973 A1 | 10/2012 |
| WO | 2015003262 A1 | 1/2015 |

OTHER PUBLICATIONS

Machine translation in English of JP-48-43535.
Machine translation in English of JP-62-194187.
Machine translation in English of CN102009588A.
Machine translation in English of CN102490718A.

(56) References Cited

OTHER PUBLICATIONS

Machine translation in English of CN102632782A.
Machine translation in English of CN202728389U.
Machine translation in English of WO2012140973A1.
Machine translation in English of JP04228325A.
Machine translation in English of WO 94/15683.
Machine translation in English of JP-2004089118.
Written opinion from the International Search Authority in PCT/CA2014/050626.

* cited by examiner

COMPACT PULLING APPARATUS

CROSS-REFERENCE TO PRIOR APPLICATIONS

The present case is a Continuation of PCT Patent Application No. PCT/CA2014/050626 filed on 30 Jun. 2014, which claims priority to U.S. Patent Application No. 61/844,893 filed on 11 Jul. 2013. The present case is also related to U.S. patent application Ser. No. 13/907,471 filed on 31 May 2013 (now U.S. Pat. No. 8,827,014 dated 9 Sep. 2014), U.S. patent application Ser. No. 13/650,965 filed on 12 Oct. 2012 (now U.S. Pat. No. 8,528,672 dated 10 Sep. 2013), U.S. patent application Ser. No. 13/650,925 filed on 12 Oct. 2012 (now U.S. Pat. No. 8,453,769 dated 4 Jun. 2013), PCT Patent Application No. PCT/CA2011/050202 filed on 15 Apr. 2011, and U.S. Patent Application Ser. No. 61/342,538 filed on 15 Apr. 2010. The entire contents of all these prior applications are hereby incorporated by reference in their entirety.

TECHNICAL FIELD

The technical field relates to compact pulling apparatuses capable of travelling over difficult terrains, such as terrains covered with snow, sand, mud, etc.

TECHNICAL BACKGROUND

Various apparatuses have been suggested over the years for travelling on difficult terrains. Of these, several are compact apparatuses allowing a person, for instance a person on skis, to be pushed or pulled using a track rotatably driven by a motor. Examples can be found in documents such as French patent application No. 2,431,304 (Jaulmes) published on 15 Feb. 1980 and in U.S. Pat. No. 4,519,470 (Allisio) published on 28 May 1985. Numerous other examples exist. Most of these apparatuses use a gasoline engine to rotatably drive the track. Some use an electric motor.

Apparatuses of this sort can be useful as light means of transportation, particularly where it is difficult or even forbidden to travel using a larger vehicle. For example, in terrains with a snow-covered surface, the snow could be too powdery and/or too deep to use a snowmobile. Another advantage of such apparatuses is that it is much more simple and easy to transport them in another vehicle than is the case with a larger and heavier vehicle, for instance a snowmobile.

Unfortunately, none of the previously-suggested apparatuses has proven fully adapted to the very rigorous winter conditions encountered during parts of the year in places where such apparatuses are likely to be useful. For instance, a very cold temperature can significantly hinder the reliability and the autonomy of an apparatus using an electric motor powered using batteries. In the case of a gasoline engine, the combination of cold weather and heat released from the engine can cause ice and compacted snow to build up at sensitive points of the apparatus. Moreover, milder temperatures are more likely to cause water infiltrations into the apparatus, which can then result in failures difficult to repair, especially if they occur deep into the forest or in other places that are difficult to access.

Also, the previously-suggested apparatuses do not allow an electric generator to be easily transported to places that are difficult to access. Numerous other limitations are challenges exist.

The compact pulling apparatus and methods disclosed in Applicant's PCT/CA2011/050202 filed on 15 Apr. 2011 (published on 20 Oct. 2011 under publ. No. WO 2011/127607) provide very good solutions capable of overcoming a vast number of limitations and challenges associated with previously-suggested apparatuses. Nevertheless, further improvements on many different aspects of the basic concept are always needed and desirable so as to even further improve the technology in this technical field.

SUMMARY

According to one aspect, there is provided a compact pulling apparatus including: a watertight elongated housing extending along a longitudinal axis, the housing including a plurality of exterior walls; a track disposed outside the housing along its longitudinal axis and enabling the apparatus to move when the track is rotatably driven around the housing; at least one track-driving motor for generating rotating output power to move the track, the at least one track-driving motor being longitudinally disposed within the housing; and a power train assembly supported by the housing and establishing a torque-transmitting engagement between the at least one track-driving motor and the track, the power train assembly including: a main longitudinally-disposed driveshaft located at least partially within the housing; a transversal driving axle; and a gearbox having an input and an output, the input being drivingly connected to the main longitudinally-disposed driveshaft, and the output being drivingly connected to the transversal driving axle; wherein the rotating output power is transmitted from inside to outside the housing by the power train assembly using at least one rotatable shaft section sealingly extending across a corresponding one of the walls of the housing.

According to another aspect, there is provided a compact pulling apparatus as shown and/or described and/or suggested herein.

According to another aspect, there is provided a method of ventilating a compact pulling apparatus as shown and/or described and/or suggested herein.

According to another aspect, there is provided a method of configuring a compact pulling apparatus as shown and/or described and/or suggested herein.

Details on the various aspects and features of the proposed concept will become apparent in light of the detailed description which follows and the appended figures.

DETAILED DESCRIPTION

Figure 1:
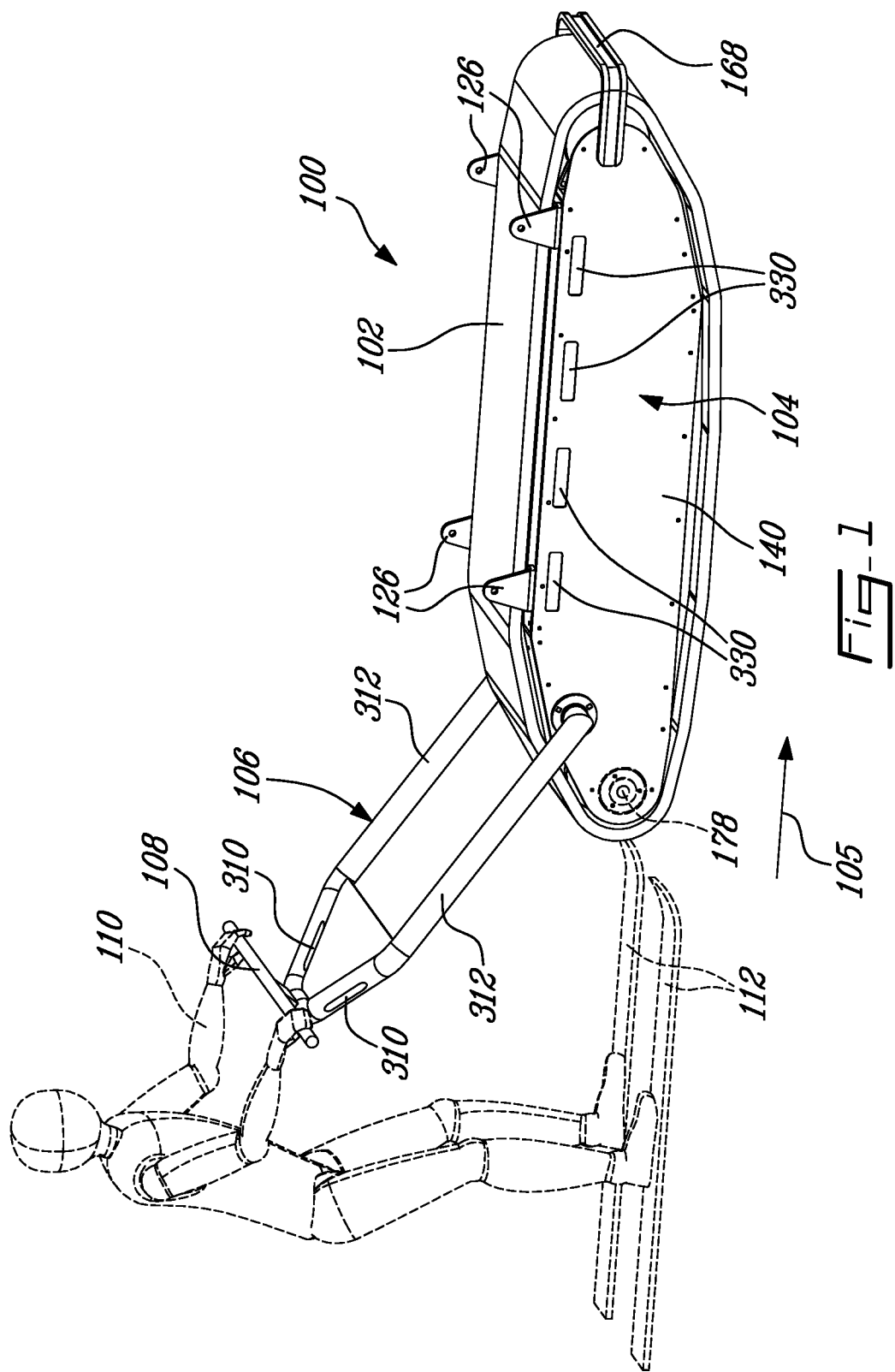
FIG. 1 is an isometric view of an example of a compact pulling apparatus based on the proposed concept.

FIG. 1 is an isometric view of an example of a compact pulling apparatus 100 based the proposed concept. The apparatus 100 includes an endless track 102 disposed around a watertight housing 104 having an elongated form. The housing 104 extends along a longitudinal axis 105. The rotation of the track 102 around the outside of the housing 104 enables the apparatus 100 to move over a ground surface, for instance a snow-covered surface. The track 102 can be made of rubber or some other polymer. Other materials are possible. The apparatus 100 can be used on almost any surfaces, including paved roads, sand, etc.

It should be noted at this point that the reference to a "watertight" housing means that its construction is watertight but this does not exclude the presence of an air ventilation circuit for circulating air in the interior of the housing 104. For instance, the ventilation circuit can be provided to cool the interior of the housing 104 when its temperature exceeds an upper threshold, such as above 25° C. Other values are possible. The ventilation circuit can also be used to keep the interior of the housing 104 warm during cold weather conditions.

The exterior of the apparatus 100 as shown in FIG. 1 is substantially similar to the one shown in Applicant's prior application published on 20 Oct. 2011 under publ. No. WO 2011/127607. However, this apparatus 100 includes many improvements over the apparatus disclosed in the previous application.

The illustrated apparatus 100 includes at least one track-driving motor for generating rotating output power to move the track 102. The motor or motors are longitudinally disposed within the housing 104 and can be, for instance, a fuel-powered internal combustion engine and/or an electric motor. The apparatus 100 of the illustrated example includes both an engine and an electric motor. Moreover, the electric motor is an electric machine having both a power generator mode where it is capable of generating electrical power using rotating output power coming from a mechanical source, and an electric motor mode where it is capable of generating rotating output power using electrical power coming from batteries. Nevertheless, one can use an electric machine that is only an electric motor (i.e. no power generator mode) in some implementations or, in others, an electric machine that is only a power generator (i.e. no electric motor mode). An apparatus such as the one shown in FIG. 1 can further include only an electric motor and no engine (i.e. be exclusively electric) or only an engine (i.e. no electric machine therein).

For the sake of simplicity, the electric machine will be referred to as a "motor/generator" in the present description. The expression "motor/generator" is used in a generic manner and it is meant to cover an electric machine having only a motor mode, only a generator mode, or both. Additional modes are further possible.

The illustrated apparatus 100 includes a handlebar 106 connected to the housing 104. The handlebar 106 extends substantially rearward of the apparatus 100. The distal end of this handlebar 106 includes handrests 108 intended to be handheld by an operator 110 who stands at the rear of the apparatus 100, for instance as shown in a semi-schematic manner in FIG. 1. The proximal end of the handlebar 106 can be pivotally or fixedly coupled to the left and right sides of the housing 104, depending on the needs. When pivotal, it is possible to limit the pivoting angles of the handlebar 106 between a minimum angle and a maximum angle with respect to the horizontal, for instance using stoppers or the like. This may be desirable to prevent the distal end of the handlebar 106 from contacting the ground surface. Variants are possible.

The operator 110 may have one or more control devices available on the handrests 108 of the handlebar 106 which can allow, among other things, controlling the travelling speed of the apparatus 100 and other functions. The controls can be connected to the housing 104 using wires and/or by wireless communication means. If desired, wires can extend internally between the proximal end and the distal end of the handlebar 106 to protect them from wear and damages.

It should be noted that the handlebar 106 may be omitted in some implementations, for instance where the apparatus 100 is part of another machine. One can even use two or more apparatuses 100 in a same machine.

Figure 9:
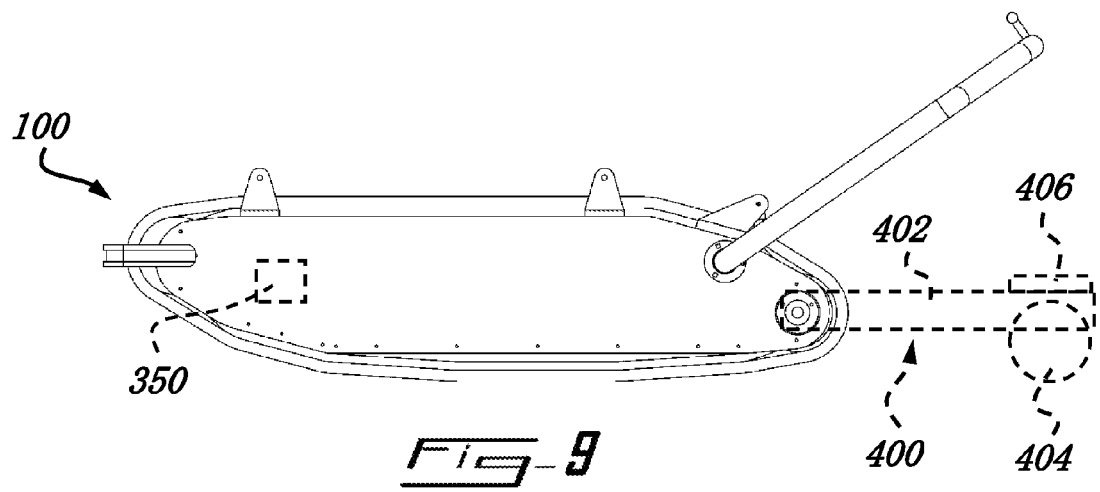
FIG. 9 is a semi-schematic side view of the apparatus shown in FIG. 1 in which the apparatus includes a generic example of a wheeled arrangement.

In FIG. 1, the operator 110 of the apparatus 100 stands on skis 112 (or the equivalent). The operator 110 holds the handlebar 106 using the handrests 108 so as to be pulled by the apparatus 100 when it moves forward. The operator 110 can change the direction of the apparatus 100 by moving the handlebar 106 sideways in the direction opposite the turn to be made. This maneuver is similar to the one made by an operator of a small conventional lawn mower or the like. While skis 112 are useful for travelling on snow or ice, it is possible for the operator 110 to follow the apparatus 100 on foot, in a sled or even using a wheeled arrangement 400, as schematically depicted in FIG. 9, depending on the surface conditions. For instance, the wheeled arrangement 400 can include a hauled unit 402 operatively connected behind the housing 104. The hauled unit 402 can include a ground-engaging tire 404 and an upper platform 406 disposed above the ground-engaging tire 404 to receive the feet of an upstanding operator 110 (FIG. 1). Variants are possible as well.

The housing 104 is low-slung in order to keep its center of gravity as low as possible. The center of gravity of the apparatus 100 is relatively low. It is at a height that is below the knees of the operator 110 in FIG. 1.

Depending on the model, it is possible to provide an arrangement which enables the apparatus 100 to back up by its own motor power. This can be very useful in certain circumstances. One or more levers or another kinds of control devices for operating a brake can also be provided. For instance, levers can be placed on the handlebar 106 similarly to those of the brakes on a bicycle or a motorcycle, for instance. Other elements can be provided on the handlebar 106 according to requirements, such as a lamp, indicator dials, etc. Other configurations and arrangements are possible as well.

The housing 104 includes a lateral wall 140 on each side. The housing 104 can, for example, be made of a metallic material, a plastic material, or both. Aluminum, including alloys thereof, is an example of one possible material for the housing 104 since this material is light and strong. Other materials are possible. The lateral walls 140 can be fixed or removable. Removable lateral walls 140 can facilitate access to all parts inside the housing 140 instead of using side doors or in addition to one or more side doors thereon. When the apparatus 100 is in motion, the lateral walls 140 on the sides of the housing 104 are closed in a watertight manner. They can be bolted and/or otherwise attached to the rest of the housing 104. The other parts of the housing 104 are configured to prevent water ingress and thus to maintain the interior of the housing 104 dry in operation.

Figure 2:
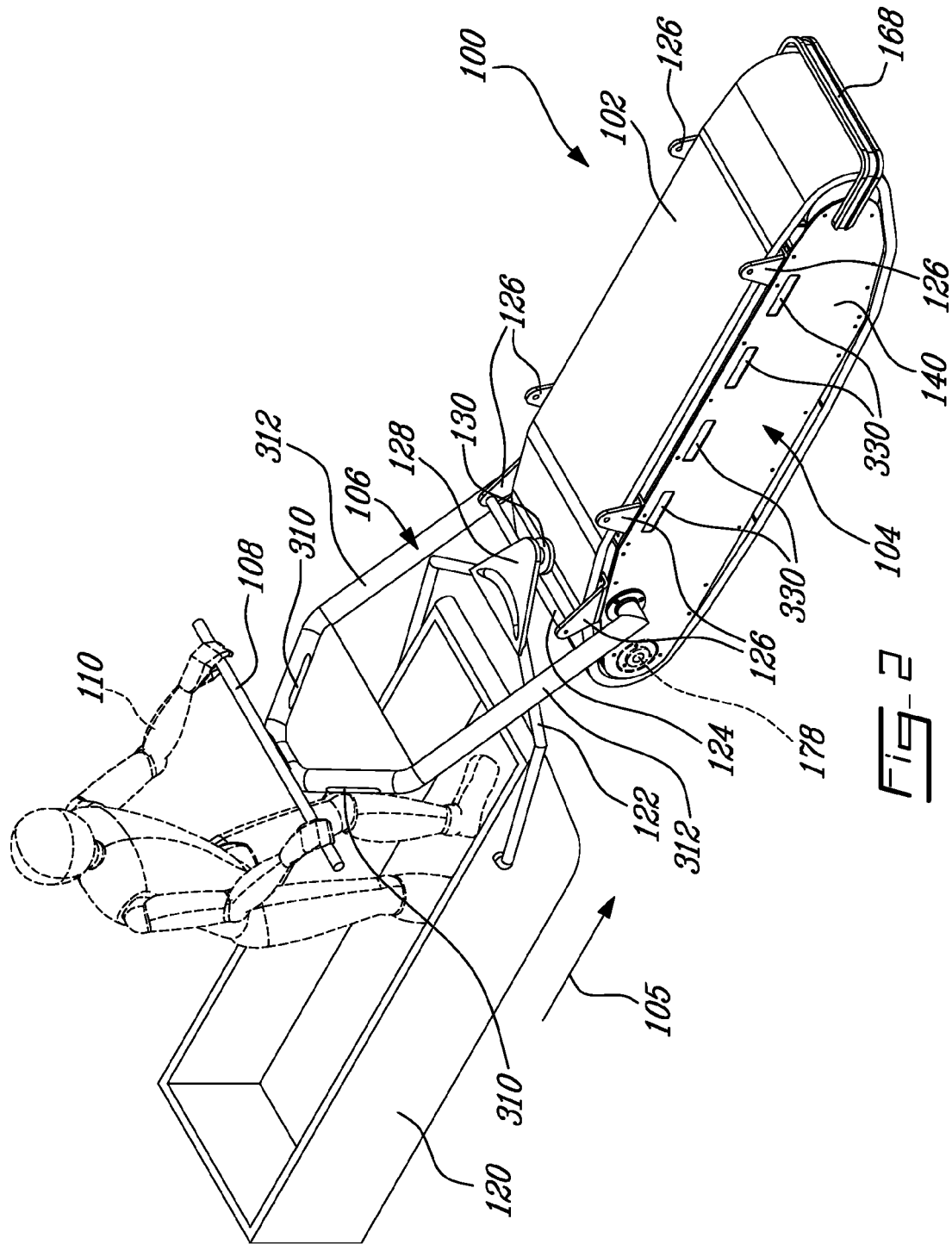
FIG. 2 is an isometric view of an example of an apparatus similar to the one of FIG. 1 but configured for use with a hitched sled.

FIG. 2 is an isometric view of an example of an apparatus 100 similar to the one of FIG. 1 but configured for use with a hitched sled 120 on which an operator 110 is standing at the rear of the apparatus 100. The sled 120 includes a hitch 122 that is connected to a support 124 which, in the illustrated example, is in the form of a transversal strut that is straight. The transversal strut 124 can also be slightly curved towards the rear at its center. The transversal strut 124 is supported using two corresponding side plates 126 projecting towards the top of the housing 104. The hitch 122 of the sled 120 includes two retainer arms, which arms are attached to a front plate 128 and can pivot around a substantially vertical axis where it joins a fastening element 130. The fastening element 130 can slide from left to right along the transversal strut 124, for instance using two pulleys provided on either side of the fastening element 130. In a turn, the fastening member 130 can thus move toward one of the ends of the transversal strut 124, this facilitating handling of the apparatus 100 and reducing the effort required from the operator 110. The roll of the sled 120 can be transmitted to the housing 104, and vice-versa. The operator 110 can control the roll motion of the apparatus 100 by transferring his/her body weight sideways on the sled 120. The motions around the pitch axis and the yaw axis, however, remain free between the apparatus 100 and the sled 120. Variants are possible as well.

The illustrated sled 120 is primarily designed for use on a frozen surface, such as snow or ice. Nevertheless, it can also be used on other types of ground surfaces, such as turf-covered surfaces, loose earth, sand, etc. One can also include wheels under the sled 120 for travelling over long distances on packed or paved surfaces. Other variants are possible as well.

When travelling in a forward direction, the apparatus 100 pulls the operator 110 along and, if need be, transports a payload such as a payload placed on board the sled 120 hitched to the apparatus 100 and/or placed in an external rack located above the track 102. The external rack can be supported for instance by additional side plates 126 provided at different locations on the top of the housing 104, as shown. Variants are possible.

The apparatus 100 can easily pull a load equivalent to at least twice its own weight on snow. For example, tests carried out using an apparatus weighing about 135 kg (300 lbs.) have shown that the apparatus 100 was able to pull a load of more than 450 kg (1000 lbs.) over a distance of about 640 km (400 miles) with the contents of a single fuel tank of 60 liters at an average speed of about 14 km/h (9 MPH). The apparatus 100, when hauling a moderate load, can travel at an average speed of about 20 km/h (12.5 MPH) over a distance of about 1200 km (750 miles) with the contents of a single fuel tank of 60 liters.

The apparatus 100 can be used for a very wide range of applications and purposes. One of them involves search and rescue emergency missions, particularly those in response to an incident occurring on a difficult and/or unstable terrain, in a confined space or in a hazardous zone. Some operations may even occur under circumstances where all these difficulties are present. An example is a rescue mission in an underground environment such as in a mine or a cave, where a victim must be pulled out of a danger zone by rescuers and then transported towards the surface over some distance through tight passages. Another example is a rescue mission following an avalanche and where the surrounding environment is still very unstable. Minimizing noise and the time spent on the scene are then critical factors.

Figure 10:
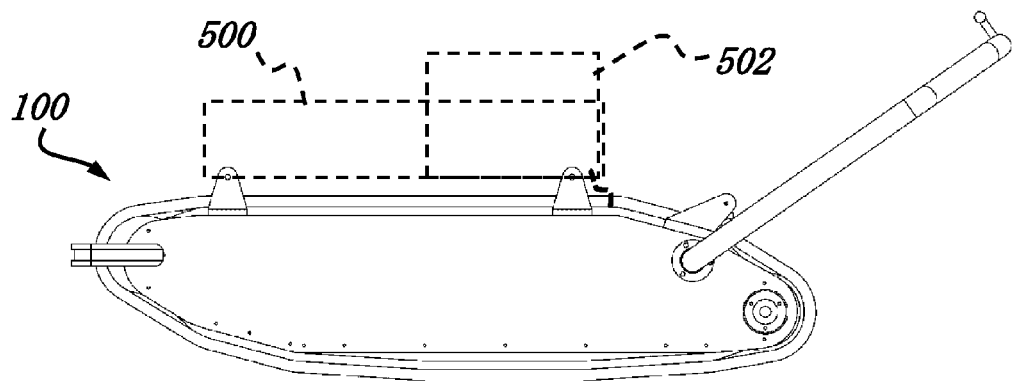
FIG. 10 is a semi-schematic side view of the apparatus shown in FIG. 1 in which the apparatus includes a generic example of search and rescue equipment and supplies.

Every incident has some unique characteristics and potential dangers for the rescue team. Thus, being able to conduct the search and rescue operation with the maximum efficiency under many different circumstances is always needed in any life-threatening situation. The apparatus 100 can help reaching this goal. With the apparatus 100, rescuers can access a remote site very quickly, even in a very difficult environment, bring search and rescue equipment 500 and supply items 502 (schematically depicted in FIG. 10) to find and/or stabilize a victim, pull a victim out of any imminent danger, and move a victim using a stretcher to bring him or her elsewhere, for instance to another evacuation vehicle and/or to other medical response personnel. Pulling a victim out of imminent danger can include, for instance, pulling someone out of a hole or a cliff using a cord attached to the apparatus 100 and using the apparatus 100 to pull. Then, the victim can be put on a sled or the like for the evacuation. Search and rescue equipment 500 and supply items 502 that can be carried by the apparatus 100 include medical supplies, mobile life support devices, rescue equipment such as ropes, harnesses, shovels, floatation devices, blankets and fire extinguishers, to name just a few, electronic devices such as sensors, telecommunication devices, global positioning systems (GPS), etc., and any other kinds of supplies that the situation may require, including other items such as tents, food and water, heaters, etc. Variants are possible as well.

Figure 3:
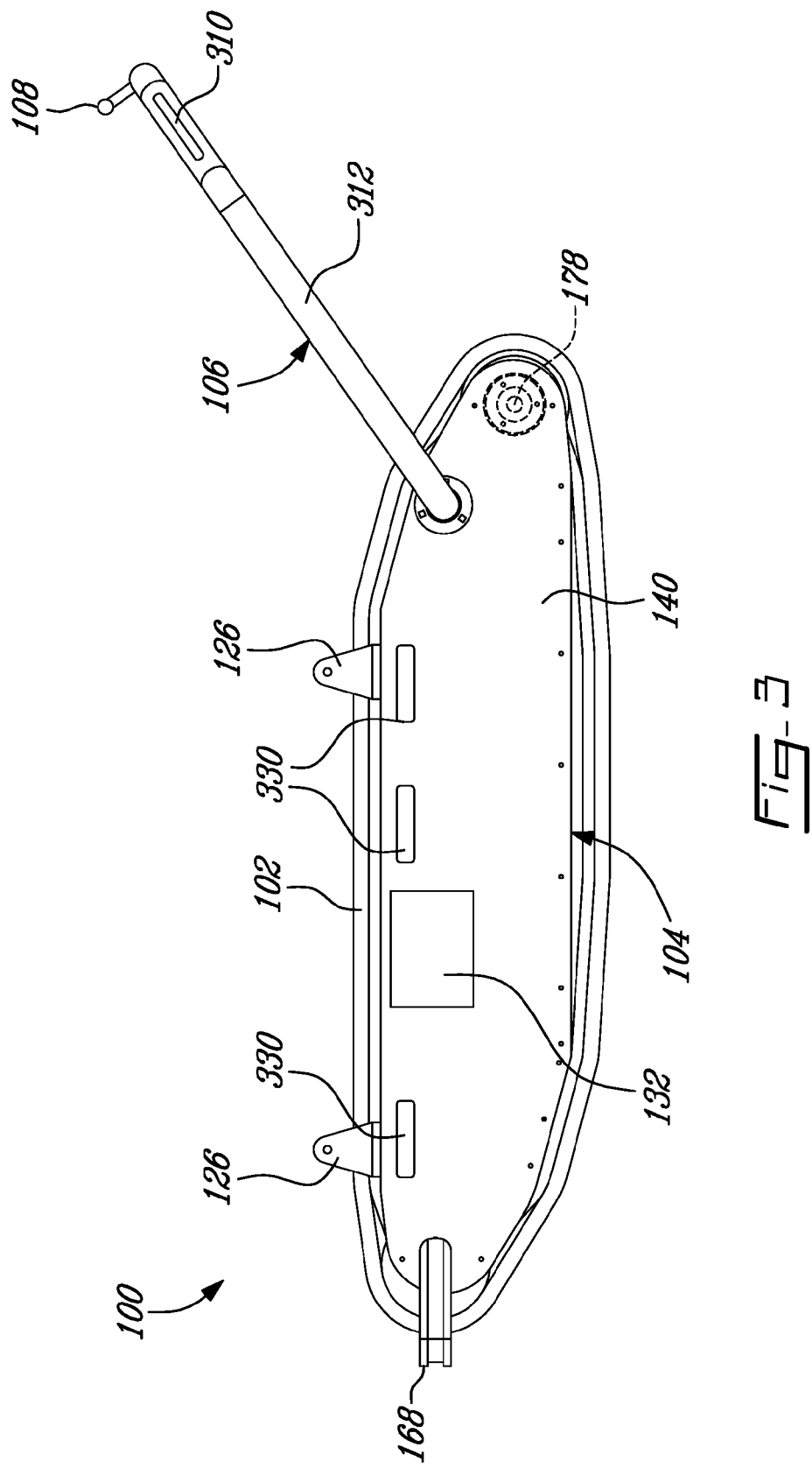
FIG. 3 is a left side view of the apparatus shown in FIG. 1.

FIG. 3 is a left side view of the apparatus 100 shown in FIG. 1.

Figure 4:
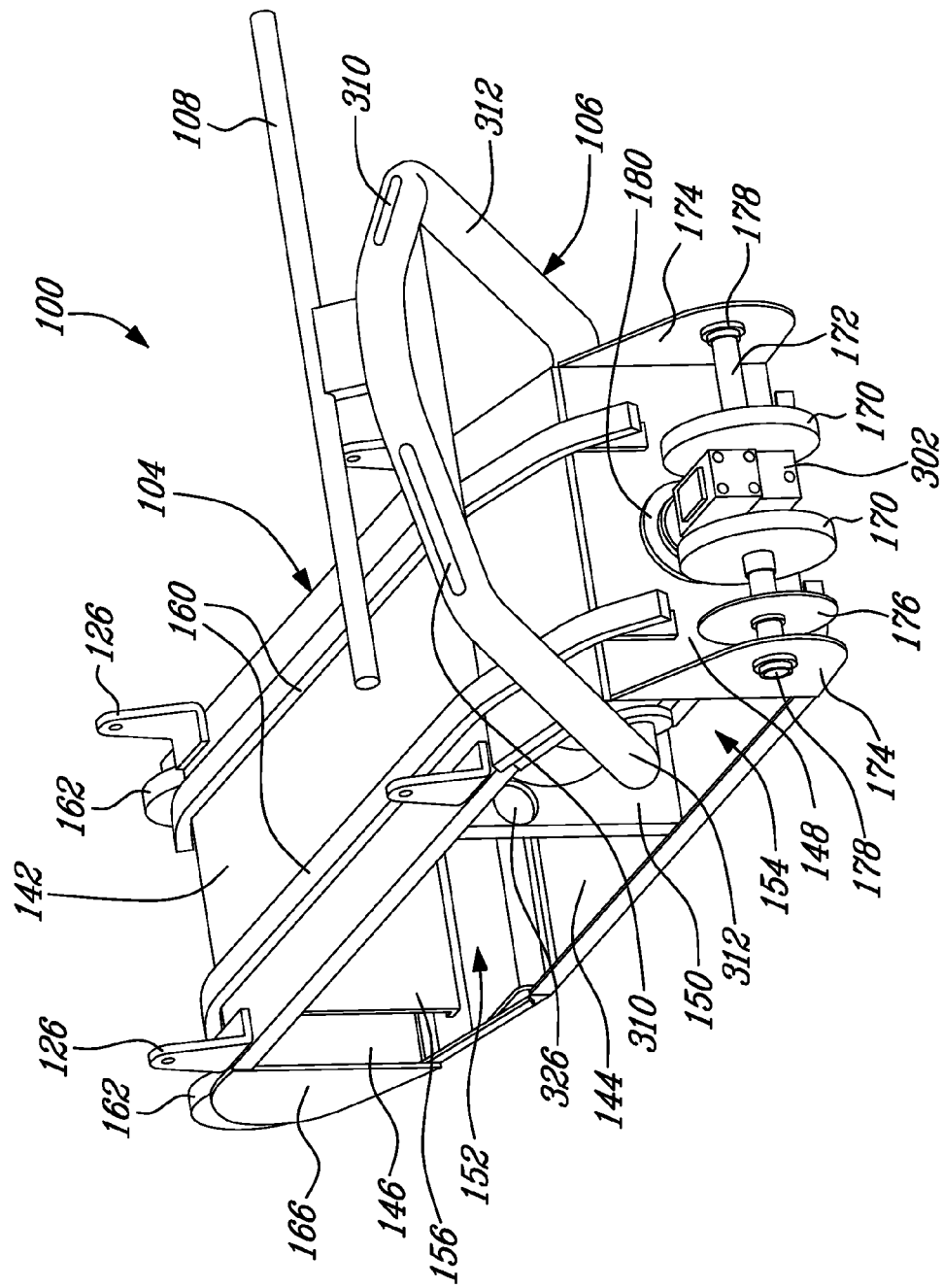
FIG. 4 is an isometric rear view of the apparatus shown in FIG. 1, which apparatus is shown without some of its components for the sake of illustration.

FIG. 4 is an isometric rear view of the apparatus 100 shown in FIG. 1. For the sake of illustration, the apparatus 100 is shown without its track 102, without the lateral walls 140 on the sides of its housing 104 and without some parts inside the housing 104. As can be seen, the housing 104 includes, in addition to the left and right lateral walls 140, a top wall 142, a bottom wall 144, a front wall 146 and a rear wall 148. In the illustrated example, a rear internal wall 150 separates a front inner chamber 152 from a rear inner chamber 154 provided inside the housing 104. The rear internal wall 150 can be constructed so as to reinforce the structure of the housing 104. Variants are possible as well. For instance, the exterior shape of the housing 104 can be different from what is shown. The interior of the housing 104 can be different from what is shown. The interior of the housing 104 can be constructed with a single interior chamber or with more than two interior chambers.

At least one front roller is rotatably connected at the front of the housing 104 for supporting and curving the track 102 around a transversal axis. In the illustrated example, two spaced-apart and front rollers 162 are provided. The front rollers 162 are coaxially mounted around a front transversal axle 164 (FIG. 5) which is supported, for instance, by an internally-greased axle connected at its ends to two opposite and longitudinally-extending front side plates 166. The front side plates 166 are rigidly connected to the front of the housing 104. The front rollers 162 are configured and disposed to engage the inner side of the track 102. Likewise, at least one rear roller is rotatably connected at the rear of the housing 104 for supporting and curving the track 102 around a transversal axis. In the illustrated example, two rear rollers 170 are provided. The rear rollers 170 are coaxially mounted around a rear transversal axle 172 which is supported at its ends by bearings 178 located in two opposite and longitudinally-extending rear side plates 174. The rear side plates 174 are rigidly connected to the rear of the housing 104. The rear rollers 170 are configured and disposed to engage the inner side of the track 102. The rollers 170 are shown as being flat on the periphery thereof but one can provide teeth around the rollers 170 in some implementations. Other arrangements and configurations are also possible for supporting the track 102 around the housing 104.

In the illustrated example, a pair of top skids 160 is disposed longitudinally on the exterior top side of the top wall 142. A pair of bottom skids, similar to those on the top wall 142, is disposed longitudinally on the exterior bottom side of the bottom wall 144. The skids are made of a narrow strip of material having a very low friction coefficient. They allow, among other things, the track 102 to rotate around the housing 104 with a reduce friction between the inner face of the track 102 and the exterior side of the housing 104. They also serve as guides to keep the track 102 in alignment with the longitudinal axis of the apparatus 100. The skids 160 can extend for several centimeters beyond the front and rear ends of the top and bottom walls 142, 144 so as to support the track 102 along almost the entire length of the apparatus 100. These ends are curved, as shown. If desired, the skids 160 can be used together with one or more pairs of smaller rollers and/or wheels that are operatively connected to the housing 104 and that are engaging the inner face of the track 102. These small rollers and/or wheels can further reduce the friction between the inner face of the track 102 and the outside of the housing 104, particularly when the apparatus 100 is used on sand-covered surfaces. Variants are possible.

As shown in FIGS. 1 to 3, a front bumper 168 is provided at the front of the illustrated apparatus 100. The opposite ends of the front bumper 168 are connected to the lateral walls 140. The front bumper 168 is removed when the lateral walls 140 are removed in this implementation. Sufficient clearance is provided between the interior of the front bumper 168 and the front rollers 162 to prevent the track 102 from interfering with the front bumper 168 when the apparatus 100 is in operation. One can also construct the apparatus 100 without bumpers.

As shown in FIG. 4, the underside of the housing 104 is convex at its center and the front of the bottom wall 144 defines an angle with reference to the horizontal. This heightening is about 3 cm at the front and at the rear of the track 102 in the apparatus 100 of the illustrated example. This central part corresponds to about one third of the length of the housing 104. The heightening, in particular, facilitates a yawing motion when making a turn as well as the manual pivoting of the apparatus 100 on hard and rough surfaces, for example on asphalt or concrete. The front transversal axle 164 is also higher than the rear transversal axle 172. This also facilitates passage over obstacles. Variants are possible as well.

The apparatus 100 includes a power train assembly supported by the housing 104 and establishing a torque-transmitting engagement between the track-driving motor(s) that are inside the housing 104 and the track 102 that is outside the housing 104. Rotating the track 102 using the rotating output power coming from the track-driving motor(s) inside the housing 104 will create the motion of the apparatus 100 over the ground surface.

The power train assembly includes a main longitudinally-disposed driveshaft 270 located at least partially within the housing 104. Most, if not all of the driveshaft 270, is inside the housing 104.

The driveshaft 270 can be in the form of a single monolithic tube or include two or more portions having intervening mechanisms between them, for instance clutches or the like. The power train assembly also includes a gearbox 302 that can be located inside or outside the housing 104. The gearbox 302 has an input and an output. The input is drivingly connected to the main longitudinally-disposed driveshaft 270. The output is drivingly connected to a transversal axle.

In the illustrated example, the rear rollers 170 are the ones driving the track 102 using rotating output power coming from the track-driving motor(s) inside the housing 104. The rear wall 148 of the housing 104 holds a sealed bearing 180 that is provided to seal the junction around the rear end of a rear portion 274 of the driveshaft 270 projecting out of the housing 104. This feature is desirable to keep the interior of the housing 104 sealed and prevent dirt and/or water from entering therein. This is also no chain coming out of the housing 104 through opened holes. The outside portion of the driveshaft 270 is drivingly connected to a gearbox 302 to which the rear transversal axle 172 is drivingly connected. The gearbox 302 is located outside the housing 104 in this example. It is also located about the center of the rear transversal axle 172. Variants are possible.

One can also use a rotatable seal arrangement instead of a bearing on the rear wall 148. The bearing could be provided instead inside the housing 104.

It should be noted that one can design the apparatus 100 with a construction where the front transversal axle 164 is the one driving the track 102. In other implementations, the track 102 could be driven from the side of the housing 104 instead of being driven from the front and/or the rear thereof with the gearbox 302 being inside. Transversal driving axle or axles extending on one or both sides of the housing 104 would be possibly used to establish a torque-transmitting engagement with the track 102. The end of the transversal driving axle or axles extending through the lateral walls 140 would include a sealing connection with the corresponding lateral wall 140. Other variants are possible as well.

The gearbox 302 of the illustrated example includes an internal speed-reducing gear mechanism between the input and the output. It is thus constructed to lower the rotation speed between its input and its output, thereby increasing the torque in the same proportion. Thus, the rotation speed of the driveshaft 270 is faster than that of the rear transversal axle 172. The internal speed-reducing gear mechanism may include, for instance, a worm screw in mesh with a corresponding gear. Such arrangement also allows having a perpendicular disposition between the input and the output. Variants are possible as well. One can also use a speed-reduction arrangement inside the housing 104, including a transmission, and/or have no variation of the transmission ratio between the input and the output of the gearbox 302.

Moreover, the internal speed-reducing gear mechanism of the gearbox 302 can include internal gears having a self-locking construction. The gearbox 302 thus locks itself in a parking mode unless its input is rotated by the driveshaft 270. In other words, an outside torque applied at its output cannot make the input rotate. This feature is very useful, for instance, to prevent the apparatus 100 from moving by itself in a steep slope due to gravity. The mechanism can become self-locking using steeper angles between the rotating elements. Variants are possible as well and one may completely omit this feature in some implementations.

Figure 11:
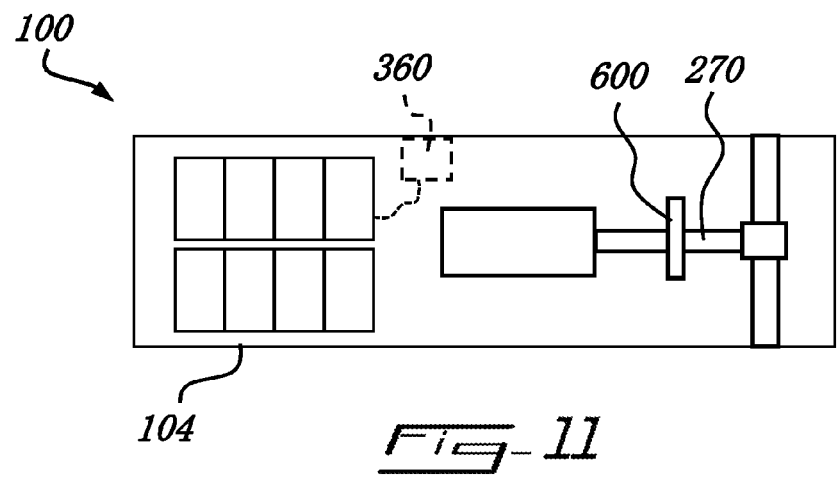
FIG. 11 is a schematic top view depicting an example of a configuration inside the apparatus shown in FIG. 1 where a disk brake is coaxially mounted on and rigidly attached to the driveshaft.

In the illustrated example, the rear transversal axle 172 can include a brake disk 176. Corresponding brake pads are attached to the housing 104 and are mounted to a movable system that can be actuated by the operator 110 from the handrests 108 when a braking force is required. Other configurations and arrangements are also possible. For instance, as schematically depicted in FIG. 11, one can include a brake disk 600 coaxially disposed on and rigidly coupled to the driveshaft 270 inside the housing 104. This would be desirable to keep the brake disk 600, and its corresponding brake pads, clean and dry.

Figure 5:
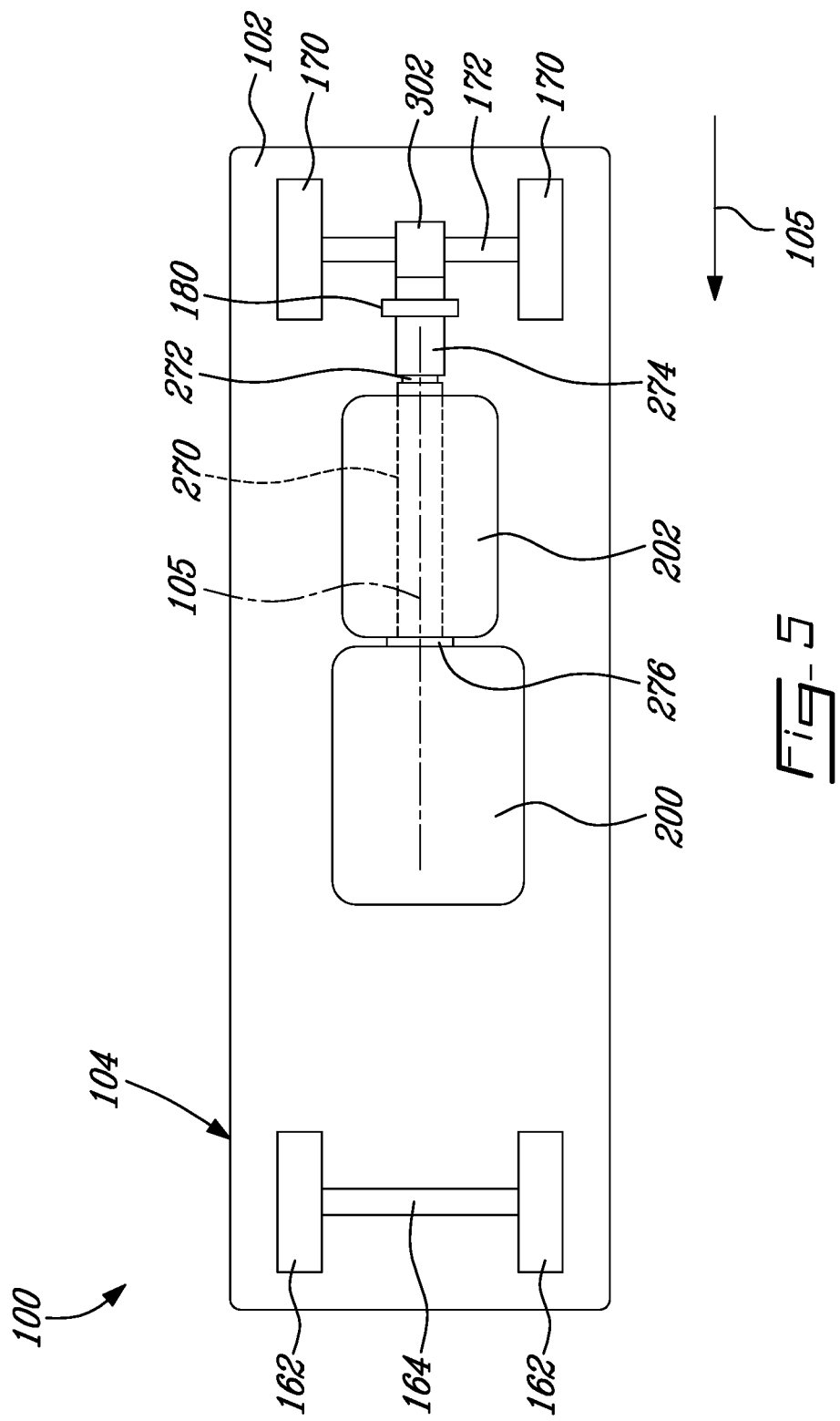
FIG. 5 is a schematic top view depicting an example of a motor configuration inside the apparatus shown in FIG. 1.

FIG. 5 is a schematic top view depicting the motor configuration inside the apparatus 100 shown in FIG. 1. This view is not necessarily to scale.

As can be seen, the apparatus 100 features a generator/motor 202 that is coaxially mounted directly on a main longitudinally-disposed driveshaft 270. Thus, to save weight, the rotor of the generator/motor 202 is integrated to the driveshaft 270. The main driveshaft 270 extends between the output of the engine 200 towards the gearbox 302 to which is drivingly connected the rear transversal axle 172. The illustrated apparatus 100 also includes an engine 200, as aforesaid. The crankshaft inside the engine 200 has a crankshaft rotation axis that is oriented substantially parallel to the longitudinal axis 105 and the front end of the driveshaft 270 is coupled to the output of the engine 200.

Clutches, for instance electric and/or centrifugal clutches, can be provided on and/or at the ends of the main driveshaft 270 to selectively engage or disengage the various components depending on the mode of operation. Each clutch allows coupling and uncoupling the parts connected thereto in a torque-transmitting engagement. The clutches can also be unidirectional mechanisms.

Among the various possible implementations using the concept presented in FIG. 5, one includes using an engine 200 and a generator/motor 202, the generator/motor 202 having a power generator mode (i.e. no electric motor mode). Such apparatus 100 can include a first clutch 272, for instance a centrifugal clutch, located between the rear end of a front portion of the main driveshaft 270 and the front end of a rear portion of the driveshaft 270. In FIG. 5, the rear portion 274 of the driveshaft 270 is disposed between the first clutch 272 and the gearbox 302. The first clutch 272 engages only when the output shaft of the engine 200 rotates at a minimum rotation speed, for instance 1500 RPM, and compensate for the rotation speed difference in the transition. Other values are also possible. This way, the engine 200 can run at idle speeds without moving the apparatus 100.

The first clutch 272 can also be set so as to remain unengaged when the engine 200 provides torque to the motor/generator 202 for generating electricity without moving the apparatus 100. The rotation speed for generating electricity could then be below the minimum rotation speed for engaging the first clutch 272. Nevertheless, one can use an electrically-activated clutch or another kind of arrangement, including a manually-activated clutch instead of a centrifugal clutch, to selectively engage or disengage the driving connection between the output of the engine 200 and the input of the gearbox 302.

Another implementation includes using the engine 200 and the generator/motor 202 as shown, the generator/motor 202 being constructed or configured to both a power generator mode and an electric motor mode.

If desired, one can provide a second clutch 276 between the engine 200 and the generator/motor 202. The second clutch 276 can be set for instance between the output of the engine 200 and the front end of the driveshaft 270. It should be noted that the words "first" and "second" are only used herein for the sake of clarity and have no implicit meaning.

The second clutch 276 can be a centrifugal clutch and/or a remotely-operated clutch and/or a unidirectional clutch. For instance, the apparatus 100 can be configured so that its motion at low speeds (e.g. 20 km/h) is only using torque coming from the generator/motor 202. Other speed values are also possible. Then, for faster speeds, the engine 200 would be started and/or the output of the idling engine 200 would be put in driving engagement with the main driveshaft 270. The apparatus 100 could also include a setting where the operator 110 can put the apparatus 100 in an "electric only" mode, for instance to minimize noises, even if the engine 200 is available.

If desired, the engine 200 can be started using the generator/motor 202 and/or a dedicated starter, such as an electric starter mounted thereon. Starting the engine 200 with the motor/generator 202 constitutes another possible mode, namely a starter mode. The starter mode alleviates the need of a dedicated starter but one can still use one for some reasons. If the second clutch 276 is a unidirectional clutch, the apparatus 100 can be configured to use the generator/motor 202 for backing up in a motor mode. It should be noted that the implementation discussed in the present paragraph can be used with or without the first clutch 272. Thus, the motor/generator 202 is used as the sole means of powering a motion of the apparatus 100 in the reverse direction. Nevertheless, it is also possible to use an engine control device 350 (see FIG. 9) to reverse rotation of the engine 200 to drive the apparatus 100 in a reverse direction. This way, one can omit the use of a reversing gear train to save weight and costs. Nevertheless, variants are possible as well.

In another possible implementation, no clutch would be provided and the main driveshaft 270 can be constructed to extend uninterruptedly from the engine 200 to the gearbox 302. The generator/motor 202 can be configured, for instance, to always initiate the motion of the apparatus 100 and start the engine 200 at the same time. The engine 200 would be stopped each time the apparatus 100 is not moving fast enough to at least reach the idle speed at the engine 200.

Once the apparatus 100 is in motion and the engine 200 started, the generator/motor 202 can be used as in a power generator mode instead of an electric motor mode and thereby generate electricity, for instance to recharge the batteries. The generator/motor 202 can also be used again as an electric motor mode if extra power is needed, for instance if the apparatus 100 hauls a heavy load and/or must climb a steep slope. The transition between the electric motor mode and the power generator mode can be done automatically and/or manually, depending on the implementation. This "hybrid" operation can be desirable to optimize the use of fuel and the electrical power transported by the apparatus 100. Variants are possible as well.

Another implementation includes using the engine 200 and the generator/motor 202 as shown, the generator/motor 202 being constructed or configured to be selectively used as a power generator mode or an electric motor mode, depending on the needs. This implementation is similar to the one described in the preceding paragraph but this time, the first clutch 272 is provided. The first clutch 272 can be a centrifugal clutch and/or a remotely-operated clutch, as aforesaid. This way, the engine 200 can drive the generator/motor 202 in a power generator mode without moving the apparatus 100.

Still if desired, one can use construct the main driveshaft 270 using two coaxially-disposed shaft portions. The rotor of the generator/motor 202 would be connected to the outer shaft portion and the output shaft of the engine 200 would be in engagement with the inner shaft portion. A clutch can be provided between the outer and inner shafts to selectively engage and disengage them from one another. Disengaging the outer and inner shaft portions can be done to avoid an unnecessary rotation of the rotor inside the generator/motor 202 when the engine 200 drive the apparatus 100 into motion but no torque is required to or from the generator/motor 202. Disengaging the outer and inner shaft portions can be done to drive the apparatus 100 into motion without the engine 200.

Figure 6:
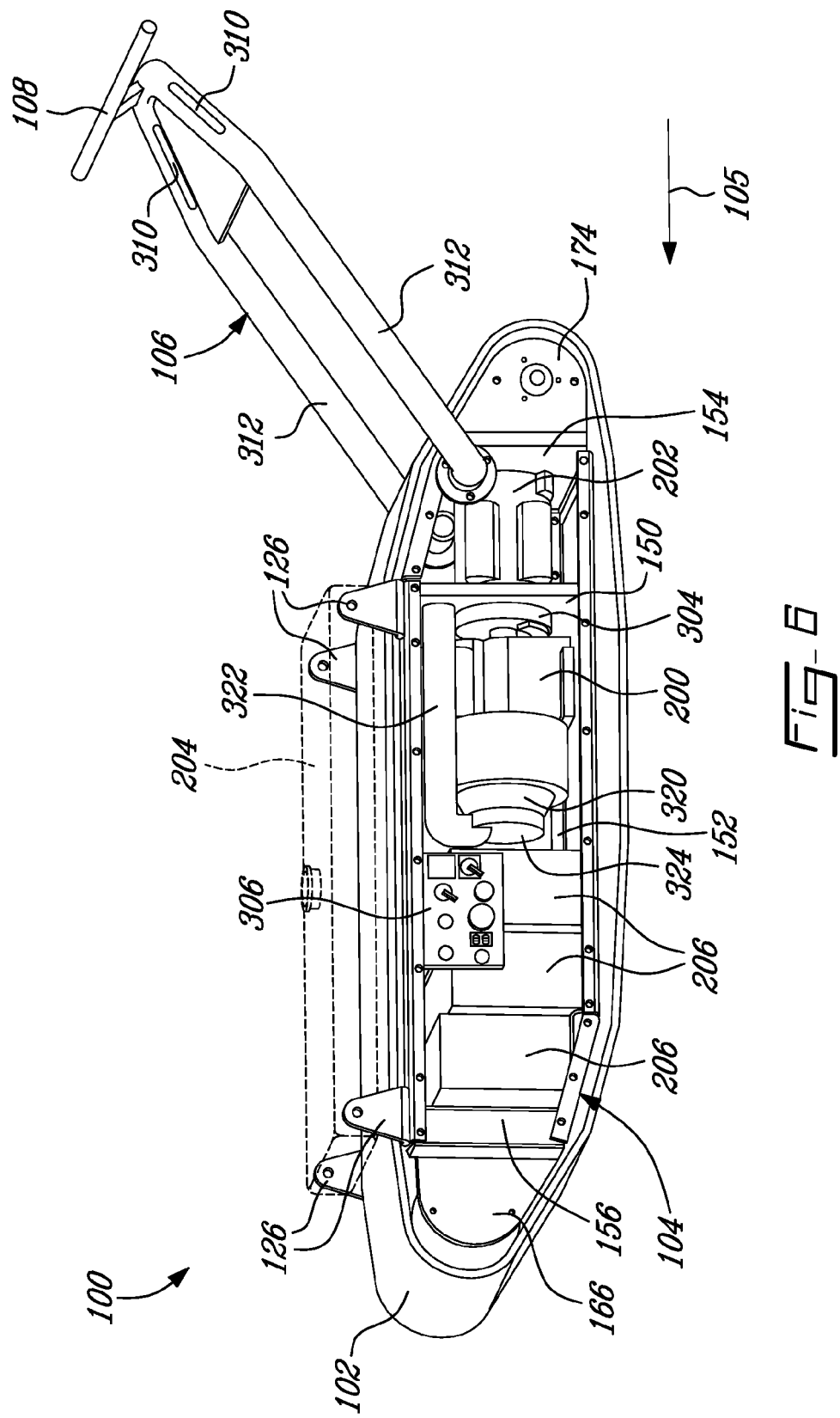
FIG. 6 is an isometric view of the apparatus shown in FIG. 1 with the side panels being removed.

FIG. 6 is an isometric view of the apparatus 100 shown in FIG. 1, with the side panels 140 being removed. As can be seen, most of the generator/motor 202 is located in the rear inner chamber 154 of the housing 104. The engine 200 is entirely located inside the front inner chamber 152 of the apparatus 100. Variants are possible as well.

Three batteries 206 are set inside the front inner chamber 152 of the illustrated example. It should be noted that one can design the apparatus 100 with only a single battery. However, for the sake of simplicity, the present text refers to "batteries" in a generic manner. This is also intended to cover situations where only a single battery is present.

The batteries 206 provide electrical power to the motor/generator 202 when it is operated in an electric motor mode and store the electrical power when it is operated in a power generator mode. The batteries 206 can also provide electrical power to an electric starter for the engine 200, if applicable. In some implementations, the operator 110 can start the engine 200 without having to access it directly, for instance by removing one of the lateral walls 140 to start it by hand, using for instance a pull cord or the like. The batteries 206 can store electrical power received from the generator/motor 202 when it is operated in a power generator mode. The generator/motor 202 can produce electrical power using mechanical power from the engine 200 even when the apparatus 100 is in motion.

The electricity produced by the generator/motor 202, when it is operated in a power generator mode, can also be used to supply one or more external equipment with electrical power, for instance using one or more electrical sockets mounted on and/or inside the apparatus 100. The electrical power can be at a voltage corresponding in particular to that of a domestic electrical outlet, for example 110V or 220V/240V at 60 Hz or also at 50 Hz. The possibility of generating electricity using the apparatus 100 can be very advantageous in many situations, for instance to workers operating power tools at remote sites or to owners of cottages located far from inhabited areas, to name just a few. Many other uses and/or situations are possible. The generator/motor 202 can have a power rating of 4000 to 6000 W in the apparatus 100 of the size shown. A smaller or even a larger capacity is also possible. The apparatus 100 may also include a power inverter unit 360 (see FIG. 11) or the like to provide external electrical power using only the batteries 206.

When generating electricity for external equipment, one or both of the lateral walls 140 of the apparatus 100 can be removed for cooling purposes. Variants are possible.

FIG. 6 also illustrates an example of a control panel 306 for the power management of the apparatus 100 when it produces electricity. The control panel 306 includes switches, dials, electric sockets, etc. It can be located inside or outside the side panels 140. Locating the control panel 306 inside the apparatus 100 prevents it from being damaged by water, dirt and/or from an impact during a motion of the apparatus 100. The control panel 306 can be accessed by removing the side panel and/or by opening a hinged cover 132 (FIG. 3) positioned in front of the control panel 306. The cover 132 has a hinge at the top edge so that when the cover 132 is opened, it can protect the control panel 306 from rain.

FIG. 6 shows an external fuel tank 204 mounted around the top of the housing 104 and the track 102. This external fuel tank 204 is supported by the side plates 126. It is also possible to provide an external rack instead of the external fuel tank 204 and use only a fuel tank located inside the housing 104. Having both a fuel tank inside the housing 104 and the external fuel tank 204 is another possibility. The external rack can be useful for carrying a payload, for example as a tool box and/or a cargo box and/or external batteries. An external fuel tank 204 such as the one shown schematically can generally hold about 60 liters of fuel. The fuel is supplied to the engine 200 using a fuel line configured and disposed to create a fluid communication between the external fuel tank and the interior of the housing 104. When external batteries are on the external rack, an electrical wiring can be provided to create an electrical connection between these external batteries and the interior of the housing 104. Variants are possible as well.

The admission of fresh air into the interior of the housing 104 can be made using different arrangements. Depending on the implementations, different configurations can be used so as to mitigate or even alleviate the risks of having foreign matters inside the housing 104, for instance water (in liquid form and/or in the form of snow or ice particles), or solid debris and/or particles such as twigs, leaves, sands, etc. All these contaminants can be carried with the air through the air intake or intakes.

Figure 7:
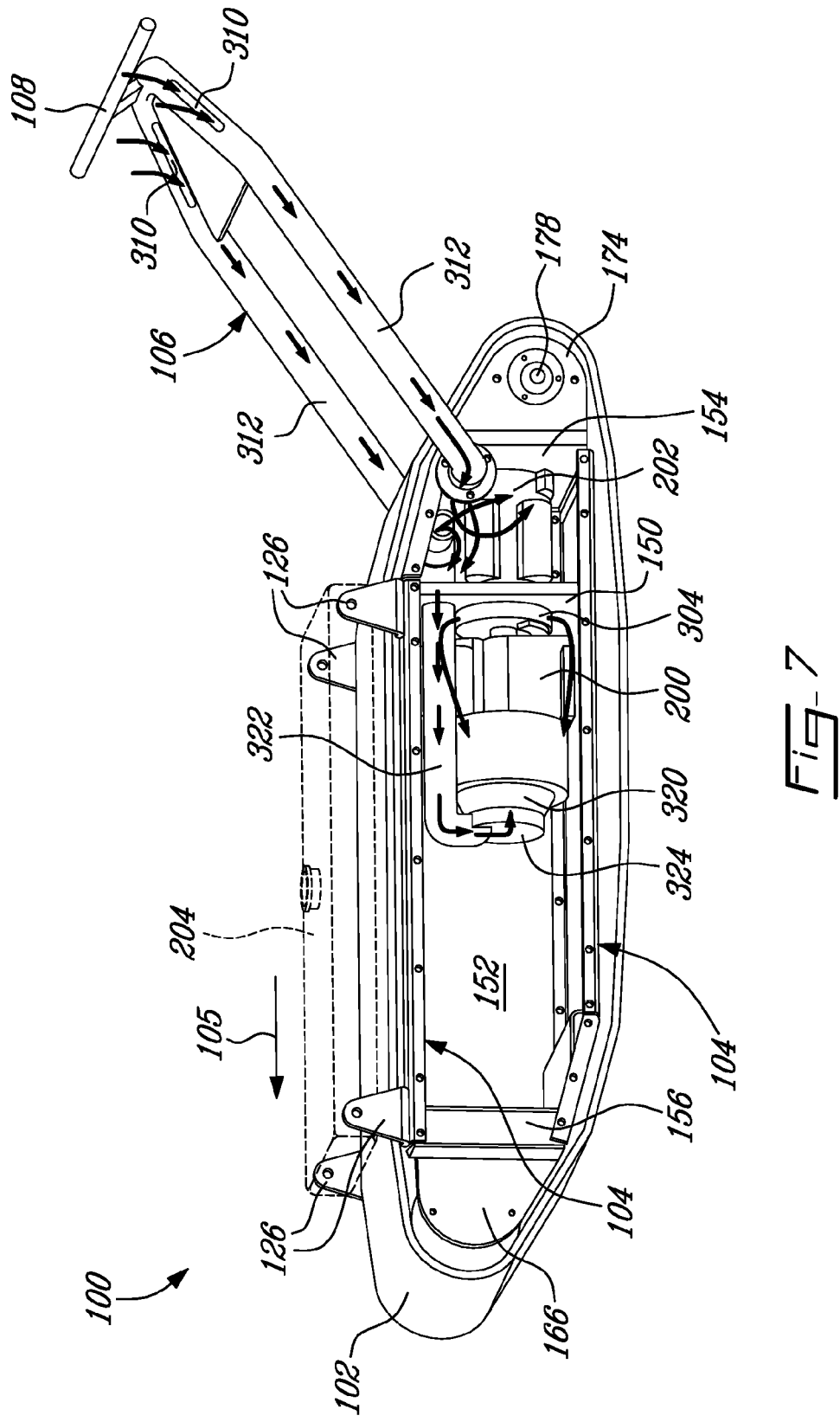
FIG. 7 is a semi-schematic view showing an example of an air circulation inside the apparatus shown in FIG. 1.

FIG. 7 is a semi-schematic view showing the air circulation inside the apparatus 100 shown in FIG. 1. The batteries 206 and the control panel 306 were removed for the sake of illustration. As can be seen, the generator/motor 202 is cooled using fresh air drawn into the rear inner chamber 154 from a pair of air intake slots 310 provided near the distal end of the handlebar 106 of this apparatus 100. They are thus relatively high above the ground surface. The handlebar 106 includes hollow tubes 312 and the proximal end of these tubes 312 opens into the rear inner chamber 154.

The handlebar 106 is can be pivotally connected to the housing 104 or be fixed in position. The air intake slots 310 are located relatively high from the ground so as to minimize the possible ingestion of water, snow or solid debris. The air intake slots 310 are also positioned on the sides of the corresponding hollow tube 312 so as to prevent dirt and/or snow to enter if the handlebar 106 is dropped on the ground surface for some reason. Variants are possible as well.

In the illustrated example, the generator/motor 202 has a front section 304 protruding inside the front inner chamber 152 through an opening made in the rear internal wall 150. This front section 304 corresponds to the outlet of the internal air cooling circuit of the generator/motor 202. Cooling air circulating inside the casing of the generator/motor 202 is discharged inside the front inner chamber 152 through the air outlet at the front section 304. The motor/generator 202 includes an internal fan that is driven into rotation when the rotor inside the motor/generator 202 is rotated. Air is then circulated through air passages forming the cooling circuit of the motor/generator 202. Air exits on the opposite side of the motor/generator 202. The warmer air exiting the motor/generator 202 can be used elsewhere in the housing 104, for instance to keep the batteries 206 warm during cold weather conditions. Variants are possible as well.

Still, in the illustrated example, the engine 200 includes a front air intake 320. This front air intake 320 is in a direct fluid communication with the rear inner chamber 154 through an air duct 322. The front air intake 320 of the engine 200 is covered by a shroud 324 to which one end of the air duct 322 is connected. The opposite end of the air duct 322 is connected to the periphery of a hole 326 (FIG. 4) made through the rear internal wall 150. The cooling air for the engine 200 comes entirely from the rear inner chamber 154 in the illustrated example. The cooling fan in the engine 200 generates the necessary suction force to draw air through the hole 326 and the air duct 322. The cooling air passes around the cylinder or cylinders of the engine 200 and ends up in the interior of the front inner chamber 152. The air required for the combustion can be drawn directly from the front inner chamber 152. It can also be drawn from the rear inner chamber 154. Other variants are also possible.

One of the advantages of the above-mentioned arrangement is that the air for the combustion inside the engine 200 is preheated and relatively dry. The engine 200 can thus be operated for long periods under very cold weather conditions and the risks of ice buildups that can potentially damage the engine 200 are mitigated, if not alleviated.

Figure 12:
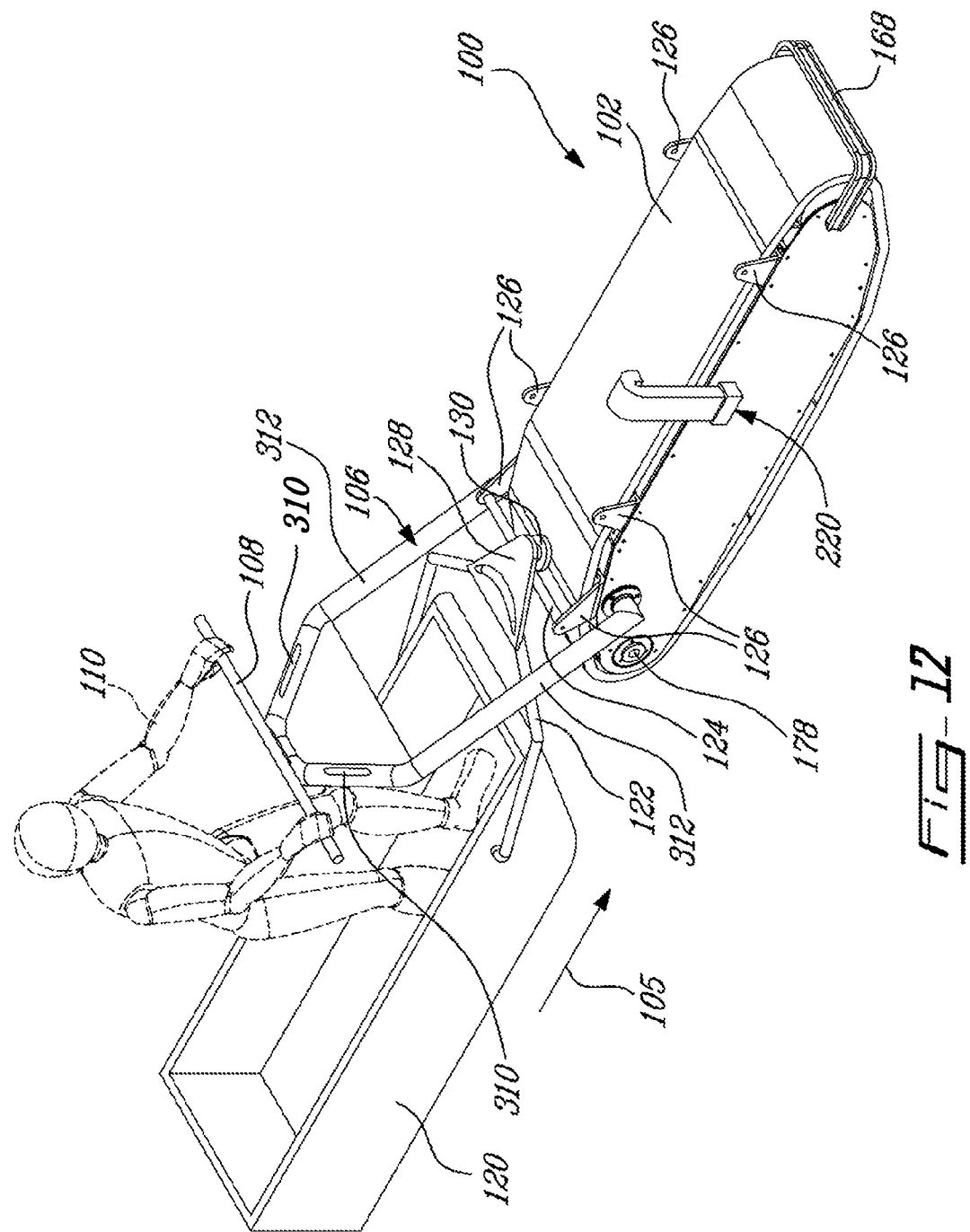
FIG. 12 is a view similar to FIG. 2 and illustrates the apparatus with an example of a snorkel.

The illustrated apparatus 100 is designed so that the front inner chamber 152 is maintained under a positive air pressure during the operation. This can be achieved for instance by providing an air exit area than is smaller than the air inlet area. For instance, one can use air outlet slots 330 between the front inner chamber 152 and outside the apparatus 100. These air outlet slots 330 can be provided through the side walls 140 of the apparatus 100, as shown in FIG. 3, and be sized smaller than the hollow tubes 312. Variants are possible as well. For instance, air can come out of the front inner chamber 152 through an exit pipe having an upper end located above the top of the track 102, and/or exit through air outlets on the handlebar 106. The handlebar 106 can even have both air intake slots 310 and air outlet slots, for instance by having one hollow tube 312 for the intake and the other hollow tube 312 for the exit. If desired, the apparatus 100 can be configured with one or more snorkels 220 to draw air into the housing 104 and/or to expel air from the housing 104, as shown in FIG. 12. The snorkel or snorkels 220 can be provided on the outer side of the lateral walls 140 and extend upwards to prevent water from entering, for instance if the apparatus 100 is used on a very humid ground and/or must go through a path during which most the housing 104 will be temporarily underwater. Such situation can be encountered by someone that must cross a shallow steam or body of water to reach a destination. Many other configurations and arrangements can be devised as well.

The positive pressure created in the front inner chamber 152 improves the watertightness of the housing 104. The housing 104 can have a very watertight structure up to the height of the air intake slots 310 on the handlebar 106. A positive pressure is maintained within the interior of the front inner chamber 152 to mitigate the risks of having water infiltration at locations which may not be completely watertight.

If desired, additional fans disposed in series on the flexible ducts connected to the air inlet and air outlet can further increase the air flow if the temperature inside the front inner chamber 152 becomes too high. These fans can be automatically switched on using a thermostat provided with a temperature sensor. Fans can also be inside the hollow tubes 312 of the handlebar 106. Other configurations and arrangements are also possible.

A small space is provided between the sides of the batteries 206 and the inner side of the lateral walls 140. Air can circulate in this space, up to the front wall 146, then come back on the opposite side between the front wall 146 and a front internal wall 156. The top side, and if needed the bottom side, of the batteries 206 can be sealed, for instance using a foam strip or the like, to create the peripheral air circuit. Before entering the air circuit around the batteries 206, air from the motor/generator 202 is circulated around the engine 200 to capture radiant heat.

Still, an internal wall can be provided between the engine 200 and the batteries 206, as shown. Motorized shutters can be used on the sides of this internal wall to selectively open and close the air circuit around the batteries 206. Closing the air circuit can be required is the batteries 206 are warm enough so as to prevent them from overheating. The motorized shutters can be controlled for instance by a thermostat and/or another automatic control arrangement or even a manual control arrangement. Variants are possible as well.

The exhaust gases coming out of the cylinder or cylinders of the engine 200 can be directed outside the apparatus 100 using an exhaust pipe having an exit located higher than the top of the track 102. The exit of the exhaust pipe can also be located elsewhere, depending on the implementation. For instance, the exit can be located in the space where the rear transversal axle 172 and the two rear rollers 170 are located. This space is partially blocked by the presence of the track 102 around the housing 104 of the apparatus 100. This configuration, among other things, reduces noise as well as preventing any possible contact between the skin or cloths of the operator 110 and the hot exit of the exhaust pipe. A check valve can be used to prevent water from entering the engine 200 when the engine 200 is not running. Other configurations and arrangements are also possible.

Figure 8:
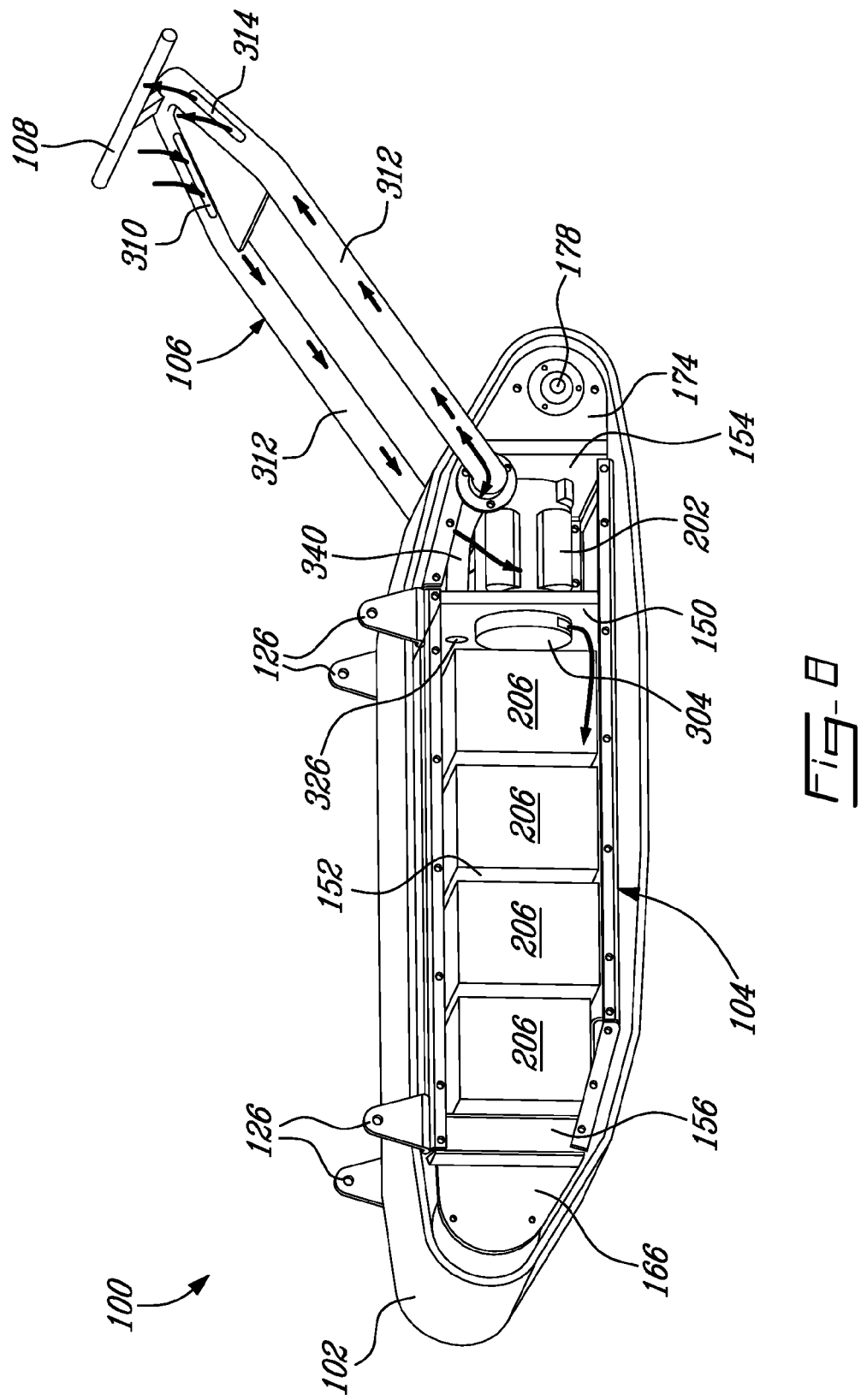
FIG. 8 is an isometric view illustrating another example of a compact pulling apparatus based on the proposed concept.

FIG. 8 is an isometric view illustrating another example of a compact pulling apparatus 100 based on the proposed concept. In this example, the motor/generator 202 can only be used in an electric motor mode since no fuel-powered engine is used. More batteries 206 are present since there is no engine. The batteries 206 are charged using an outside power source.

In use, air can circulate in an air path circuit going around the batteries 206, for instance going forward in a space along the left side thereof, then from left to right in a space at the front of the front inner chamber 152, and going backward in a space along the right side of the batteries 206 before exiting the housing 104. The spaces at the left and the right side of the batteries 206 can be separated from one another using a longitudinally-disposed foam element or the like provided along the top side of the batteries 206 and, if necessary, along the bottom side thereof. Other configurations and arrangements are also possible. The peripheral air circuit inside the front inner chamber 152 can keep the batteries 206 at an optimum temperature under cold weather conditions.

In the arrangement shown in FIG. 8, air exits at the distal end of the handlebar 106 through a pair of air outlet slots 314. Thus, air enters from one of the hollow tubes 312 and exits through the other one of the hollow tubes 312. The hollow tubes 312 are closed at their top end to prevent the air intake slots 310 and the air outlet slots 314 from communicating with one another inside the handlebar 106. The last segment of the ventilation circuit includes an air duct 340 that can send air directly into the other hollow tube 312 without mixing with the incoming air. Air exits the front inner chamber 152 using the hole 326 made through the rear internal wall 150. Variants are possible as well.

It should be noted that the configuration of the ventilation circuit of FIG. 8 can be done in the implementation shown in FIGS. 1 to 7, and vice-versa. With the configuration of FIG. 8, the housing 104 can have a very watertight structure up to the height of the air intake slots 310 and the air outlet slots 314 on the handlebar 106. The apparatus 100 can then even be immersed in water from time or time, as might be required for instance when the apparatus 100 must cross an unfrozen stream or similar body of water.

Figure 13:
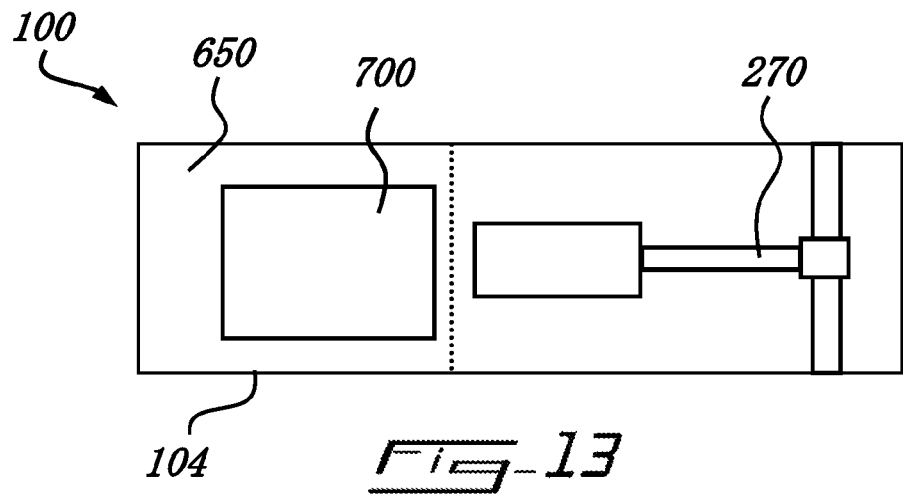
FIG. 13 is a schematic top view depicting an example of a configuration inside the apparatus shown in FIG. 1 where a self-powered electric generator is provided.
Figure 14:
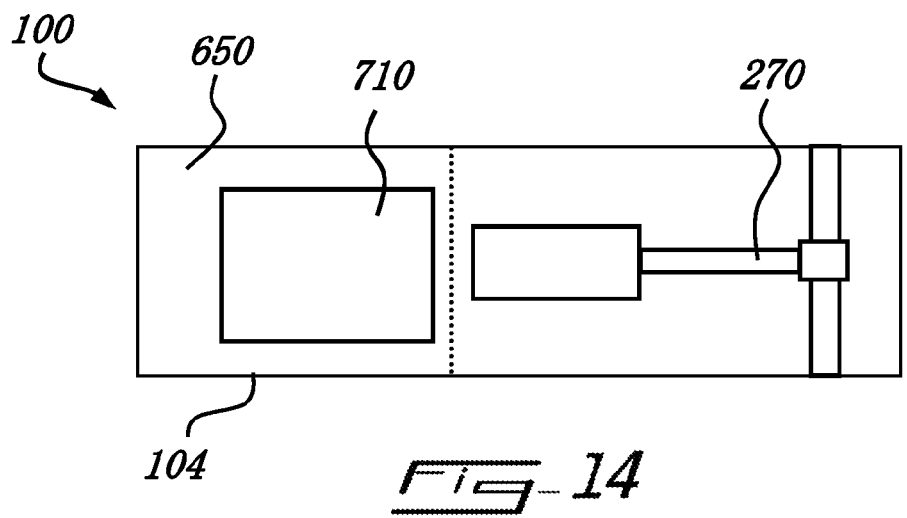
FIG. 14 is a schematic top view depicting an example of a configuration inside the apparatus shown in FIG. 1 where a self-powered water pump is provided.
Figure 15:
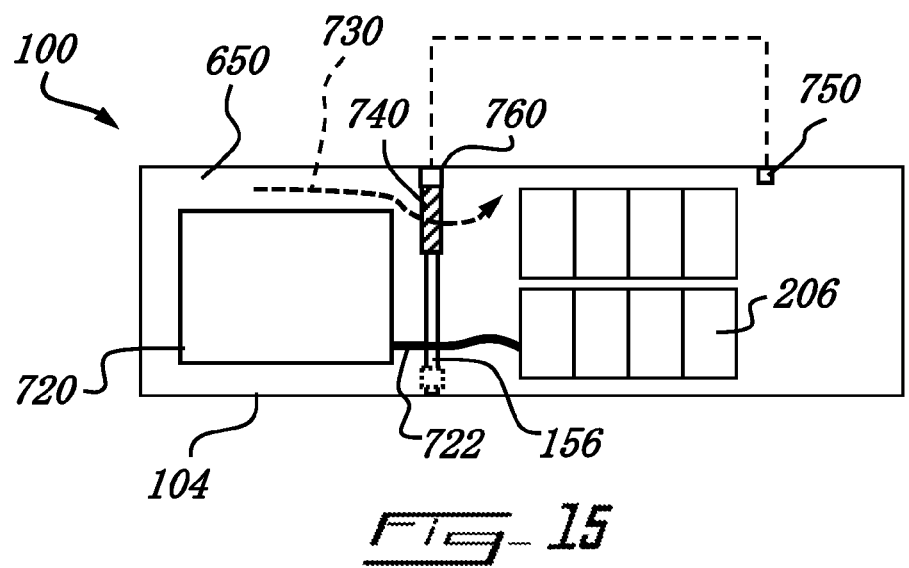
FIG. 15 is a schematic top view depicting an example of a configuration inside the apparatus shown in FIG. 1 where a self-powered electric generator and a motorized shutter are provided.

The arrangement illustrated in FIG. 8 can be modified by using, for instance, fewer batteries 206 and/or a larger housing 104 so as to provide a cargo space 650 (see FIG. 13) inside the housing 104. The cargo space 650 can extend between the internal wall 156 and the front wall of the housing 104. This cargo space 650 can be used to carry equipment such as a self-powered electric generator 700 (FIG. 13), a self-powered water pump 710 (FIG. 14), etc. The equipment can be designed to run from either outside the apparatus 100, after being moved out of the cargo space 650, or be integrated inside the apparatus 100. This last feature is desirable to avoid handling the equipment. If desired, as schematically depicted in FIG. 15, one can design the apparatus 100 with an integrated self-power electric generator 720 having an electric output 722 linked to the batteries 206 inside the housing 104 for charging them. It may also include an air circuit 730 allowing heat from the running generator 720 to be directed towards the batteries 206 in order to keep them warm during cold weather conditions. The air circuit 730 can include, for instance, a motorized shutter 740 or the like, such as a motorized shutter 740 linked to a thermostat 750 and a servomotor 760, to selectively open and close the air circuit 730. Variants are possible as well.

If desired, in all implementations, it is possible to provide a heating element, for instance a heating cable, can be provided inside the housing 104 to keep the batteries 206 warm when charged and/or stored outdoors during cold weather. The electrical power for this heating element can be supplied using an external source, such as a domestic power outlet or the like.

The proximal end of the handlebar 106 can be connected elsewhere on the apparatus 100 in all implementations from what is shown. For instance, one can have the handlebar 106 configured and disposed to make the apparatus 100 readily useable in any direction. The left and right sides of the proximal end of the handlebar 106 can be connected at the center of the apparatus 100 on both lateral walls 140 but other configurations are possible as well. This feature can be useful for changing the direction of motion of the apparatus 100 so as to turn the apparatus 100 over 180 degrees without pivoting the housing 104, simply by pivoting the handlebar 106 from one end of the housing 104 to the other. For instance, if the apparatus 100 is at a dead end, the operator 110 can simply move the handrests 108 on the other side and the apparatus 100 can be moved backwards with the operator 110 standing behind it. A completely reversible apparatus would then have no front or rear end per se since they would be both interchangeable.

Figure 16:
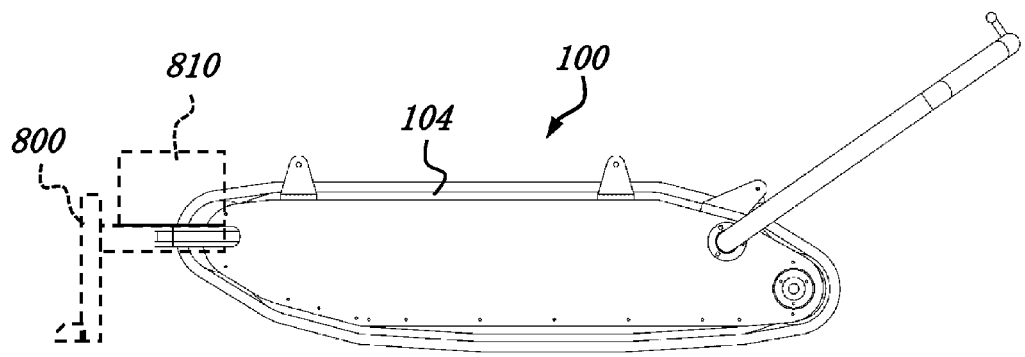
FIG. 16 is a semi-schematic side view of the apparatus shown in FIG. 1 in which the apparatus includes a generic example of a plow blade.
Figure 17:
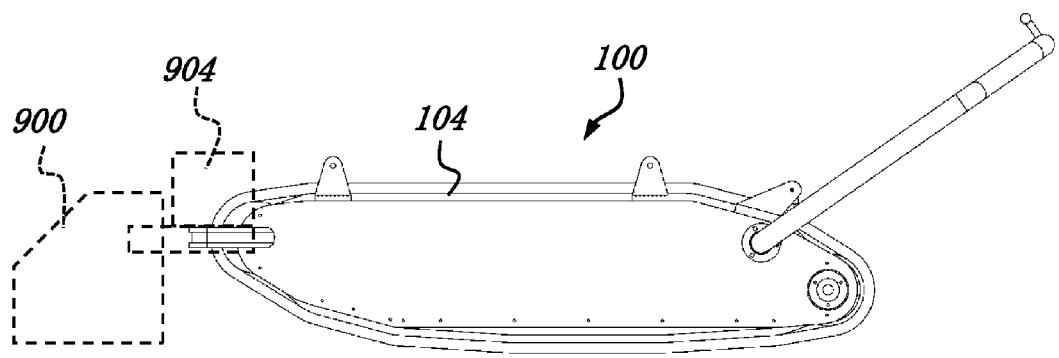
FIG. 17 is a semi-schematic side view of the apparatus shown in FIG. 1 in which the apparatus includes a generic example of a bucket.
Figure 18:
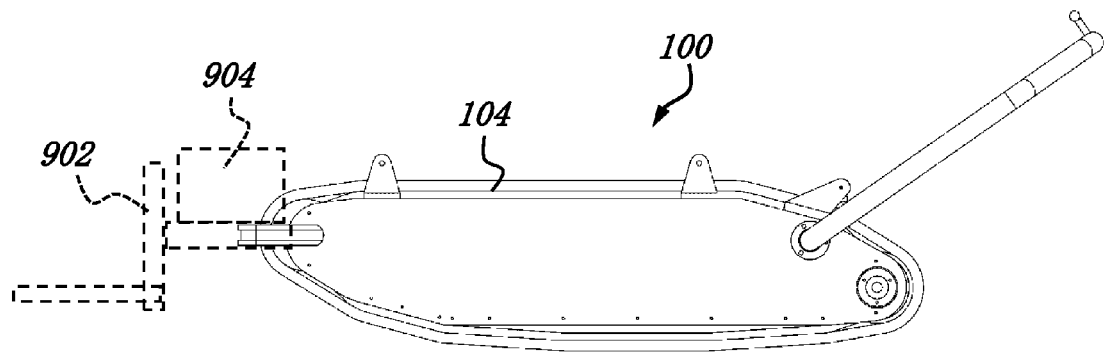
FIG. 18 is a semi-schematic side view of the apparatus shown in FIG. 1 in which the apparatus includes a generic example of a forklift.

It could be useful in some implementations to provide on the housing 104 an attachment for a plow blade 800, for instance a plow blade 800 installed at the front of the apparatus 100, as schematically depicted in FIG. 16. The plow blade 800 can be used for instance to push or pull snow and/or ice. It is also possible to use the plow blade 800 for other materials, such as sand, earth, mud, etc. The plow blade 800 can include a lifting system 810 for moving the plow blade 800 in and out of engagement with the ground surface. One can also provide a bucket 900 (see FIG. 17) or a forklift 902 (see FIG. 18) with a corresponding loader attachment 904 to the housing 104. Variants are possible.

The present detailed description and appended figures are only examples. A person working in this field will be able to see that variations can be made while still staying within the framework of the proposed concept.

LIST OF REFERENCE NUMERALS 100 apparatus
102 track
104 housing
105 longitudinal axis
106 handlebar
108 handrests
110 operator
112 skis
120 sled
122 hitch
124 support (transversal strut)
126 side plate
128 front plate
130 fastening element
132 hinged cover
140 lateral wall
142 top wall
144 bottom wall
146 front wall
148 rear wall
150 rear internal wall
152 front inner chamber
154 rear inner chamber
156 front internal wall
160 top skid
162 front roller
164 front transversal axle
166 front side plate
168 front bumper
170 rear roller 172 rear transversal axle
174 rear side plate
176 brake disk
178 bearing
180 bearing
200 gasoline engine
202 generator/motor
204 external fuel tank
206 batteries
220 snorkel
270 main longitudinally-disposed driveshaft
272 clutch
274 rear portion of the longitudinally-disposed driveshaft
276 clutch
302 gearbox
304 front section (generator/motor)
306 control panel
310 air intake slot
312 hollow tube
314 air outlet slot
320 front air intake (engine)
322 air duct
324 shroud
326 hole (rear internal wall)
330 air outlet slot
340 air duct
350 engine control device
360 power invert unit
400 wheeled arrangement
402 hauled unit
404 ground-engaging tire
406 upper platform
500 search and rescue equipment
502 search and rescue supply items
600 brake disk (on driveshaft)
650 cargo space
700 self-powered electric generator (FIG. 13)
710 self-powered water pump
720 self-powered electric generator (FIG. 15)
722 electric output
730 air circuit
740 motorized shutter
750 thermostat
760 servomotor
800 plow blade
810 lifting system
900 bucket
902 forklift
904 loader attachment

What is claimed is:

1. A compact pulling apparatus including:
a watertight elongated housing extending along a longitudinal axis, the housing including a plurality of exterior walls;
a track disposed outside the housing along its longitudinal axis and enabling the apparatus to move when the track is rotatably driven around the housing;
at least one track-driving motor for generating rotating output power to move the track, the at least one track-driving motor being longitudinally disposed within the housing; and
a power train assembly supported by the housing and establishing a torque-transmitting engagement between the at least one track-driving motor and the track, the power train assembly including:
a main longitudinally-disposed driveshaft located at least partially within the housing;
a transversal driving axle; and
a gearbox having an input and an output, the input being drivingly connected to the main longitudinally-disposed driveshaft, and the output being drivingly connected to the transversal driving axle;
wherein the rotating output power is transmitted from inside to outside the housing by the power train assembly using at least one rotatable shaft section sealingly extending across a corresponding one of the walls of the housing.

2. The compact pulling apparatus as defined in claim 1, wherein the gearbox includes one among the following two features:
an internal speed-reducing gear mechanism between the input and the output of the gearbox;
an internal speed-reducing gear mechanism between the input and the output of the gearbox, the internal speed-reducing gear mechanism of the gearbox being self-locking.

3. The compact pulling apparatus as defined in claim 1, wherein the gearbox and the transversal driving axle are located outside the housing.

4. The compact pulling apparatus as defined in claim 3, wherein the apparatus includes one among the following two features:
the transversal driving axle extends across the output of the gearbox;
the transversal driving axle extends across the output of the gearbox, the gearbox being positioned substantially at a center position along the transversal driving axle.

5. The compact pulling apparatus as defined in claim 4, wherein the rotatable shaft section is a portion of the main longitudinally-disposed driveshaft and is sealingly connected to the wall by a sealed bearing or a rotatable seal arrangement.

6. The compact pulling apparatus as defined in claim 5, wherein the apparatus includes one among the following two features:
the output of the gearbox is drivingly connected to the transversal driving axle located at a rear end of the apparatus;
the output of the gearbox is drivingly connected to the transversal driving axle located at a rear end of the apparatus, the transversal driving axle being drivingly connected to the track in a torque-transmitting engagement using at least one roller coaxially mounted on and rigidly coupled to the transversal driving axle, the at least one roller engaging an inner side of the track.

7. The compact pulling apparatus as defined in claim 1, further including an external rack attached to the housing and located above the track, the external rack including at least one among the following features:
a storage space for a payload;
external batteries and an electrical wiring extending between the external batteries and the interior of the housing;
an external fuel storage tank and a fuel line extending and providing a fluid communication between the external fuel tank and the interior of the housing.

8. The compact pulling apparatus as defined in claim 1, further including one among the following two features:
a handlebar having a distal end and a proximal end, the proximal end being attached to the housing;
a handlebar having a distal end and a proximal end, the proximal end being attached to the housing, the proximal end of the handlebar having a left and a right side that are pivotally attached to the corresponding left and right sides of the housing.

9. The compact pulling apparatus as defined in claim 8, wherein the handlebar has at least one among the following features:

- the handlebar includes at least one hollow tube providing at least one air circuit extending between the interior of the housing and an air opening located on the handlebar, the at least one air circuit passing through a pivotal attachment of the handlebar with at least one among the left and right sides of the housing;
- the handlebar includes means for preventing the distal end of the handlebar from falling on the ground surface;
- the distal end of the handlebar is capable of being positioned at either ends of the housing, whereby the apparatus can be operated in either directions upon pivoting the distal end of the handlebar to a corresponding one of the ends of the housing;
- the distal end of the handlebar is capable of being positioned at either ends of the housing, the proximal end of the handlebar being pivotally connected at substantially a center of the housing, whereby the apparatus can be operated in either directions upon pivoting the distal end of the handlebar to a corresponding one of the ends of the housing;
- the handlebar includes wires extending internally between the proximal end and the distal end of the handlebar to protect the wires from wear and damage.

10. The compact pulling apparatus as defined in claim 1, further including at least one of the following features:

- at least one snorkel extending sideways and upwards from the housing for admission of fresh air inside the housing from a location above the track;
- a hauled unit operatively connected behind the housing, the hauled unit including a ground-engaging tire and an upper platform disposed above the ground-engaging tire for receiving an upstanding operator;
- a brake disk coaxially mounted on and rigidly attached to the driveshaft;
- at least one side panel pivotally connected to a corresponding wall on the housing using an upper hinge, the side panel providing a rain protection when opened;
- skids provided with one or more pairs of rollers and/or wheels that are operatively connected to the housing and that are engaging the inner face of the track for reducing the friction between the inner face of the track and outside of the housing;
- at least one among a search and rescue equipment and a search and rescue supply item mounted on the apparatus;
- at least one among a plow blade, a bucket and a forklift attached to the housing;
- the housing includes a cargo space located inside the housing, the cargo space holding a self-powered equipment;
- the housing includes a cargo space located inside the housing, the cargo space holding a self-powered equipment, the self-powered equipment having at least one of the following features:
  - the self-powered equipment is integrated within the apparatus and can run from inside the cargo space;
  - the self-powered equipment is a self-powered electric generator running on fuel, the self-powered electric generator including an electric output for charging batteries inside the apparatus when running and/or for providing heat to the batteries when running using an air circuit extends between the cargo space and another part of inside the housing where the batteries are located;
  - the self-powered equipment includes a self-powered water pump running on fuel.

11. The compact pulling apparatus as defined in claim 1, wherein the apparatus includes one among the following two features:

- the at least one track-driving motor includes an electric motor coaxially mounted on the driveshaft;
- the at least one track-driving motor includes an electric motor coaxially mounted on the driveshaft, the electric motor receiving electrical power from batteries located inside the housing.

12. The compact pulley apparatus as defined in claim 11, further including a power inverter unit, the power inverter unit receiving electrical power from the batteries inside the housing to power one or more external equipment.

13. The compact pulling apparatus as defined in claim 1, wherein the housing includes an interior wall dividing the interior of the housing between a front inner chamber and a rear inner chamber and/or the apparatus further includes an internal ventilation circuit inside the housing, the ventilation circuit passing through at least one motorized shutter provided on the interior wall.

14. The compact pulling apparatus as defined in claim 13, wherein the apparatus includes means for pressurizing the front inner chamber of the housing at a positive pressure.

15. The compact pulling apparatus as defined in claim 1, wherein the apparatus has only one among the following features:

- the at least one track-driving motor only includes an electric motor to generate the rotating output power for driving the track;
- the at least one track-driving motor includes an internal-combustion engine having a crankshaft rotation axis that is oriented substantially parallel to the longitudinal axis, the engine having an output that is drivingly connected to an end of the driveshaft, the engine including an integrated shroud and a built-in ventilator having an inlet in fluid communication with the rear inner chamber through a corresponding air duct;
- the at least one track-driving motor includes an internal-combustion engine and an electric motor, the engine having a crankshaft rotation axis that is oriented substantially parallel to the longitudinal axis, the engine having an output that is drivingly connected to an end of the driveshaft;
- the at least one track-driving motor only includes an internal-combustion engine having a crankshaft rotation axis that is oriented substantially parallel to the longitudinal axis;
- the at least one track-driving motor only includes an internal-combustion engine having a crankshaft rotation axis that is oriented substantially parallel to the longitudinal axis, the apparatus including an engine control device to reverse rotation of the engine and drive the apparatus in a reverse direction.

16. The compact pulling apparatus as defined in claim 1, wherein the at least one track-driving motor includes an internal-combustion engine and an electric motor, the engine having a crankshaft rotation axis that is oriented substantially parallel to the longitudinal axis, the engine having an output that is drivingly connected to an end of the driveshaft, the apparatus further including one among the following two features:

a first clutch allowing coupling and uncoupling two portions of the driveshaft located between the electric motor and the gearbox;

a first clutch allowing coupling and uncoupling two portions of the driveshaft located between the electric motor and the gearbox, the first clutch being a centrifugal clutch or an electrically-operated clutch.

17. The compact pulling apparatus as defined in claim 16, wherein the electric motor includes at least a starter mode and a power generator mode, the starter mode providing rotating output power to drive a crankshaft of the engine into rotation for starting the engine, and the generator mode creating electrical power from the rotating output power received from the engine.

18. The compact pulling apparatus as defined in claim 17, further including one among the following two features:

a second clutch provided between the engine and the driveshaft;

a second clutch provided between the engine and the driveshaft, the second clutch being a centrifugal clutch, an electrically-operated clutch or an unidirectional clutch.

19. The compact pulling apparatus as defined in claim 16, wherein the electric motor has a power generator mode that can be activated to generate a braking force when the apparatus is in motion and charge the batteries using torque from the braking force.

20. The compact pulling apparatus as defined in claim 1, wherein the driveshaft includes two coaxially-disposed shaft sections.

\* \* \* \* \*